(12) United States Patent
Yasuda et al.

(10) Patent No.: US 8,515,293 B2
(45) Date of Patent: Aug. 20, 2013

(54) COHERENT RECEIVER

(75) Inventors: Wakako Yasuda, Tokyo (JP); Daisaku Ogasahara, Tokyo (JP); Kiyoshi Fukuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/138,958

(22) PCT Filed: Apr. 21, 2010

(86) PCT No.: PCT/JP2010/002856
§ 371 (c)(1),
(2), (4) Date: Nov. 2, 2011

(87) PCT Pub. No.: WO2010/128577
PCT Pub. Date: Nov. 11, 2010

(65) Prior Publication Data
US 2012/0045208 A1    Feb. 23, 2012

(30) Foreign Application Priority Data

May 7, 2009    (JP) .................................. 2009-112708

(51) Int. Cl.
*H04B 10/06*    (2006.01)

(52) U.S. Cl.
USPC ........................................................ 398/208

(58) Field of Classification Search
USPC ................................................. 398/205, 208
See application file for complete search history.

(56) References Cited

U.S. PATENT DOCUMENTS 7,769,305 B1 * 8/2010 Roberts et al. ................ 398/206
8,005,368 B2 * 8/2011 Roberts et al. ................ 398/150

(Continued)

FOREIGN PATENT DOCUMENTS

JP    2008-153863 A    7/2008
JP    2009-512365 A    3/2009

(Continued)

OTHER PUBLICATIONS

International Search Report in PCT/JP2010/002856 dated May 25, 2010 (English Translation Thereof).

(Continued)

*Primary Examiner* — Nathan Curs
(74) *Attorney, Agent, or Firm* — McGinn IP Law Group, PLLC

(57) ABSTRACT

A coherent receiver 1 assigns a first transmission signal to first transmission polarization, assigns a second transmission signal to second transmission polarization, and receives a quadrature multiplexed signal formed by applying quadrature multiplexing to the first transmission polarization and the second transmission polarization. The coherent receiver includes a detection means 10 for detecting the first transmission polarization and the second transmission polarization according to prescribed first reception polarization and second reception polarization and obtaining a first detected signal and a second detected signal; a quantization means 20 for quantizing the first detected signal and the second detected signal and obtaining a first quantized signal and a second quantized signal; and a signal processing means 30 for, when filtering the first quantized signal and the second quantized signal using a prescribed filtering control algorithm to form a first demodulated signal and a second demodulated signal respectively, adjusting filter coefficients of the filtering control algorithm according to the first quantized signal and the second quantized signal and the first demodulated signal and the second demodulated signal, and outputting the first demodulated signal and the second demodulated signal to a first output terminal and a second output terminal, respectively.

21 Claims, 14 Drawing Sheets

(56) References Cited

U.S. PATENT DOCUMENTS

| | | |
|---|---|---|
| 8,086,114 B2 | 12/2011 | Liu et al. |
| 8,260,156 B2 * | 9/2012 | Qian et al. .................... 398/209 |
| 2005/0196176 A1 | 9/2005 | Sun et al. |
| 2006/0285854 A1 | 12/2006 | Sun et al. |
| 2006/0285855 A1 | 12/2006 | Sun et al. |
| 2007/0092259 A1 | 4/2007 | Bontu et al. |
| 2007/0092260 A1 | 4/2007 | Bontu et al. |
| 2007/0147850 A1 * | 6/2007 | Savory et al. ................ 398/208 |
| 2008/0145066 A1 | 6/2008 | Hoshida |
| 2009/0129787 A1 * | 5/2009 | Li et al. ......................... 398/208 |
| 2009/0214201 A1 | 8/2009 | Oda et al. |
| 2010/0003028 A1 | 1/2010 | Zhang et al. |
| 2010/0092168 A1 | 4/2010 | Li et al. |
| 2010/0142946 A1 | 6/2010 | Liu et al. |
| 2010/0189445 A1 | 7/2010 | Nakashima et al. |
| 2011/0064421 A1 * | 3/2011 | Zhang et al. ................. 398/208 |

FOREIGN PATENT DOCUMENTS

| | | |
|---|---|---|
| JP | 2009-094777 A | 4/2009 |
| JP | 2009-198364 | 9/2009 |
| JP | 2009-253972 | 10/2009 |
| JP | 2009-296596 | 12/2009 |
| JP | 2010-81611 | 4/2010 |
| JP | 2010-130698 | 6/2010 |
| JP | 2010-178090 | 8/2010 |
| WO | WO 2005/117285 A1 | 12/2005 |

OTHER PUBLICATIONS

D.N. Godard, "Self-Recovering Equalization and Carrier Tracking in Two-Dimensional Data Communication System," IEEE Trans. On Comm. vol. COM-28, No. 11. pp. 1967-1875, Nov. 1980.

Goto et al., IEICE Technical Report OCS2004-47, Jun. 11, 2004, pp. 43-48.

Japanese Office Action dated Feb. 28, 2012, with English translation.

S. J. Savory et al., "Transmission of 42.8Gbit/s Polarization Multiplexed NRZ-QPSK over 6400km of Standard Fiber with no Optical Dispersion Compensation", Optical Fiber communication and the National Fiber Optic Engineers Conference, 2007, OFC/NFOEC 2007. Conference on, Mar. 25, 2007.

* cited by examiner

COHERENT RECEIVER

TECHNICAL FIELD

The present invention relates to a coherent receiver, and in particular, to a coherent receiver which coherently detects polarization-multiplexed signals (quadrature multiplexed signals) and specifies transmission polarization.

BACKGROUND ART

In recent years, along with the spread of the Internet, the capacity of data traveling over networks (transmission capacity) has been increased. As such, in so-called large artery communication channels linking large cities, optical transmission channels in which the capacity per one channel is 10 gigabit per second (Gb/s) or 40 Gc/s have been introduced.

In the optical transmission of 10 Gb/s, OOK (On-Off-Keying) is used as a modulation system. On the other hand, in the optical transmission of 40 Gb/s, as the optical pulse width is as short as 25 picosecond (ps), an influence of wavelength dispersion is large. As such, if OOK is used, optical transmission of 40 Gb/s is not suitable for long distance transmission. Under such a circumstance, a multilevel modulation system, which is phase modulation, is used, and in the optical transmission of 40 Gb/s, QPSK (Quadrature Phase Shift Keying) is mainly used as a modulation system.

Further, in the ultrahigh-speed optical transmission at a level of 100 Gb/s, it is necessary to widen the optical pulse width by increasing the number of multiplex to reduce the so-called baud rate (modulation rate). This means that it is necessary to further suppress the influence of wavelength dispersion.

In the ultrahigh-speed optical transmission, polarization multiplexing has been known as one method of suppressing an influence of wavelength dispersion. In the polarization multiplexing, surfaces in which the field intensities of a dual optical signal $E_X$ and $E_Y$ oscillate are orthogonally crossed and entered into an optical fiber. The optical signals $E_X$ and $E_Y$ (namely, field intensities) propagate while repeating random rotation in a state where the quadrature relation is maintained in the optical fiber. At the output terminal of the optical fiber, a quadrature multiplexed signal (hereinafter also referred to as quadrature signal) $S_{XY}=E_X+E_Y$, where the rotation angle $\theta$ is unknown, is obtained.

As polarization multiplexing, an optical system and a signal processing system have been known. In the optical system, polarization separation is performed using a polarization control element and a polarization separation element. This means that the quadrature signal $S_{XY}=E_X+E_Y$ is separated by being projected to polarization surfaces X' and Y' defined by the polarization separation element. Thereby, optical signals (output signals) represented as $E_{X'}=aE_X+bE_Y$ and $E_{Y'}=cE_X+dE_Y$ are obtained (polarization separation: a to d represent coefficients).

Then, with monitoring of the outputs signals after the separation, the output signals are returned to the polarization control element in such a manner that the output signals become maximum, that is, $E_{X'}=aE_X$ (b=0) and $E_{Y'}=dE_Y$ (c=0), to thereby estimate the rotation angle $\theta$.

However, as the polarization control element generally has a control frequency (clock frequency) of about 100 MHz, it is difficult to follow high-speed fluctuation in polarization.

On the other hand, in the signal processing system, polarization separation is performed after obtaining an electrical signal by coherently detecting the above-described quadrature signal. As such, in the signal processing system, the quadrature signal $E_X+E_Y$ is projected on the polarization planes X' and Y' defined by the local light to be detected, and electric field information in each of the polarization planes X' and Y' is obtained as an electric signal.

Here, as an example, a polarization separation system by means of signal processing will be described with use of a typical coherent receiver shown in FIG. 14.

The coherent receiver shown in FIG. 14 includes a local oscillator (LO) 91, a 90° hybrid 92, photodetectors (PD) 93 and 94, an A/D (analog/digital) converter 95, and a DSP (Digital Signal Processing) chip 96.

A quadrature signal $S_{XY}=E_X+E_Y$ is supplied to the 90° hybrid 92. The 90° hybrid 92 also receives a local light $S_{X'Y'}$ from the LO 91. The quadrature signal $S_{XY}$ interferes with the local light $S_{X'Y'}$ in the 90° hybrid 92 and is output as interference signals $E_{X'}$ and $E_{Y'}$. The interference signals $E_{X'}$ and $E_{Y'}$ are respectively detected by the PDs 93 and 94. These detected signals include electric field information, and are quantized (A/D converted) by the A/D converter 95 and supplied to the DSP chip 96 as quantized signals $e_x'$ and $e_y'$.

For example, the DSP chip 96 has a butterfly filter 96a which operates with a CMA (Constant Modulus Algorithm). The filter coefficient of the butterfly filter 96a is determined according to the CMA operation by the CMA operation section 96b (for example, see Non-Patent Document 1). The butterfly filter 96a filters the quantized signals $e_x'$ and $e_y'$, and cancels the polarization rotation angle $\theta$ thereof. As a result, the DSP chip 96 outputs the demodulated signals (electric field information) $e_x$ and $e_y$ from the ports 97 and 98.

As described above, the interference signal $E_{X'}$ (or $E_{Y'}$) includes the field intensity (field intensity may be indicated as $E_X$ or $E_Y$). As such, although the amplitude of the interference signal $E_{X'}$ (and $E_{Y'}$) fluctuates according to the polarization rotation, the field intensity of the interference signal $E_{X'}$ (or $E_{Y'}$) is controlled to be constant by the CMA. As a result, the interference signal $E_{X'}$ (or $E_{Y'}$) converges at the field intensity $E_X$ (or $E_Y$).

On the other hand, as a coherent receiver, one which receives a high-speed signal light has been known. Such a receiver combines a local oscillation light having polarization-multiplexed quadrature polarization components in which the optical frequencies are different to each other, and a received signal light, in a hybrid circuit, and then photoelectrically converts it in two differential photodetectors. Then, the photoelectrically converted signal is converted to a digital signal in an AD conversion circuit, and signal processing is executed in a digital computing circuit to estimate received data (for example, see Patent Document 1).

[Patent Document 1] JP 2008-153863 A
[Non-Patent Document 1] D. N. Godard, "Self-Recovering Equalization and Carrier Tracking in Two-Dimensional Data Communication System", IEEE Trans. on Comm., Vol. COM-28, No. 11, pp. 1967-1875, November 1980

SUMMARY OF THE INVENTION

As described above, as the CMA only controls the field intensity of the quantized signal $e_x'$ or $e_y'$ to be constant, the quantized signals $e_x'$ and $e_y'$ do not necessarily converge at the demodulated signals $e_x$ and $e_y$, respectively. For example, the quantized signals $e_x'$ and $e_y'$ may converge at the demodulated signals $e_y$ and $e_x$, respectively. This means that the demodulated signals $e_x$ and $e_y$ are not necessarily associated with the ports 97 and 98, respectively.

As described above, in the above coherent receiver, the field intensity is controlled to be constant, that is, the amplitude is controlled, to thereby separate the multiplexed polarization. Accordingly, there is a problem that a transmission signal transmitted as X polarization or Y polarization is not received while being recognized as X polarization or Y polarization.

In view of the above, an object of the present invention is to provide a coherent receiver capable of receiving a transmission signal transmitted as X polarization which is first transmission polarization or Y polarization which is second transmission polarization while recognizing it as X polarization or Y polarization reliably.

In order to achieve the object, a coherent receiver, according to an aspect of the present invention, assigns a first transmission signal to first transmission polarization, assigns a second transmission signal to second transmission polarization, receives a quadrature multiplexed signal formed by applying quadrature multiplexing to the first transmission polarization and the second transmission polarization, and includes a detection means for detecting the first transmission polarization and the second transmission polarization according to prescribed first reception polarization and second reception polarization and obtaining a first detected signal and a second detected signal; a quantization means for quantizing the first detected signal and the second detected signal and obtaining a first quantized signal and a second quantized signal; and a signal processing means for, when filtering the first quantized signal and the second quantized signal using a prescribed filtering control algorithm to form a first demodulated signal and a second demodulated signal respectively, adjusting filter coefficients of the filtering control algorithm according to the first quantized signal and the second quantized signal and the first demodulated signal and the second demodulated signal, and outputting the first demodulated signal and the second demodulated signal to a first output terminal and a second output terminal, respectively.

Further, a polarization separation program, according to another aspect of the present invention, is a program which causes a receiver, which assigns a first transmission signal to first transmission polarization, assigns a second transmission signal to second transmission polarization, and receives a quadrature multiplexed signal formed by applying quadrature multiplexing to the first transmission polarization and the second transmission polarization, to detect the first transmission polarization and the second transmission polarization according to prescribed first reception polarization and second reception polarization and obtain a first detected signal and a second detected signal; quantize the first detected signal and the second detected signal and obtain a first quantized signal and a second quantized signal; and when filtering the first quantized signal and the second quantized signal using a prescribed filtering control algorithm to form a first demodulated signal and a second demodulated signal respectively, adjust filter coefficients of the filtering control algorithm according to the first quantized signal and the second quantized signal and the first demodulated signal and the second demodulated signal, and output the first demodulated signal and the second demodulated signal to a first output terminal and a second output terminal, respectively.

Further, a polarization separation method, according to another aspect of the present invention, includes causing a receiver, which assigns a first transmission signal to first transmission polarization, assigns a second transmission signal to second transmission polarization, and receives a quadrature multiplexed signal formed by applying quadrature multiplexing to the first transmission polarization and the second transmission polarization, to detect the first transmission polarization and the second transmission polarization according to prescribed first reception polarization and second reception polarization and obtain a first detected signal and a second detected signal; quantize the first detected signal and the second detected signal and obtain a first quantized signal and a second quantized signal; and when filtering the first quantized signal and the second quantized signal using a prescribed filtering control algorithm to form a first demodulated signal and a second demodulated signal respectively, adjust filter coefficients of the filtering control algorithm according to the first quantized signal and the second quantized signal and the first demodulated signal and the second demodulated signal, and output the first demodulated signal and the second demodulated signal to a first output terminal and a second output terminal, respectively.

As the present invention is configured as described above, the present invention has an advantageous effect that a transmission signal, transmitted as X polarization which is first polarization or as Y polarization which is second polarization, can be received while being recognized as X polarization or Y polarization reliably.

EXEMPLARY EMBODIMENTS

First Exemplary Embodiment

Figure 1:
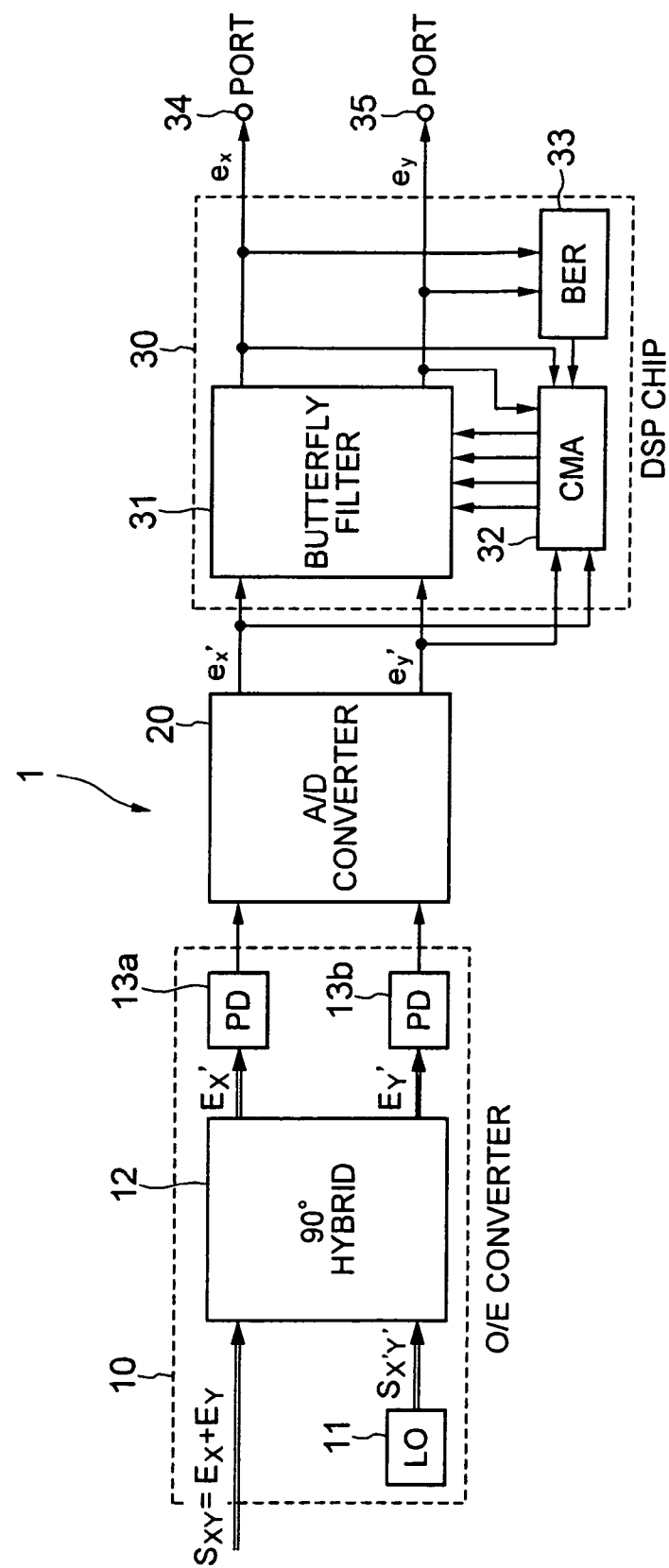
FIG. 1 is a block diagram showing the configuration of a coherent receiver according to a first exemplary example of the present invention.
Figure 2:
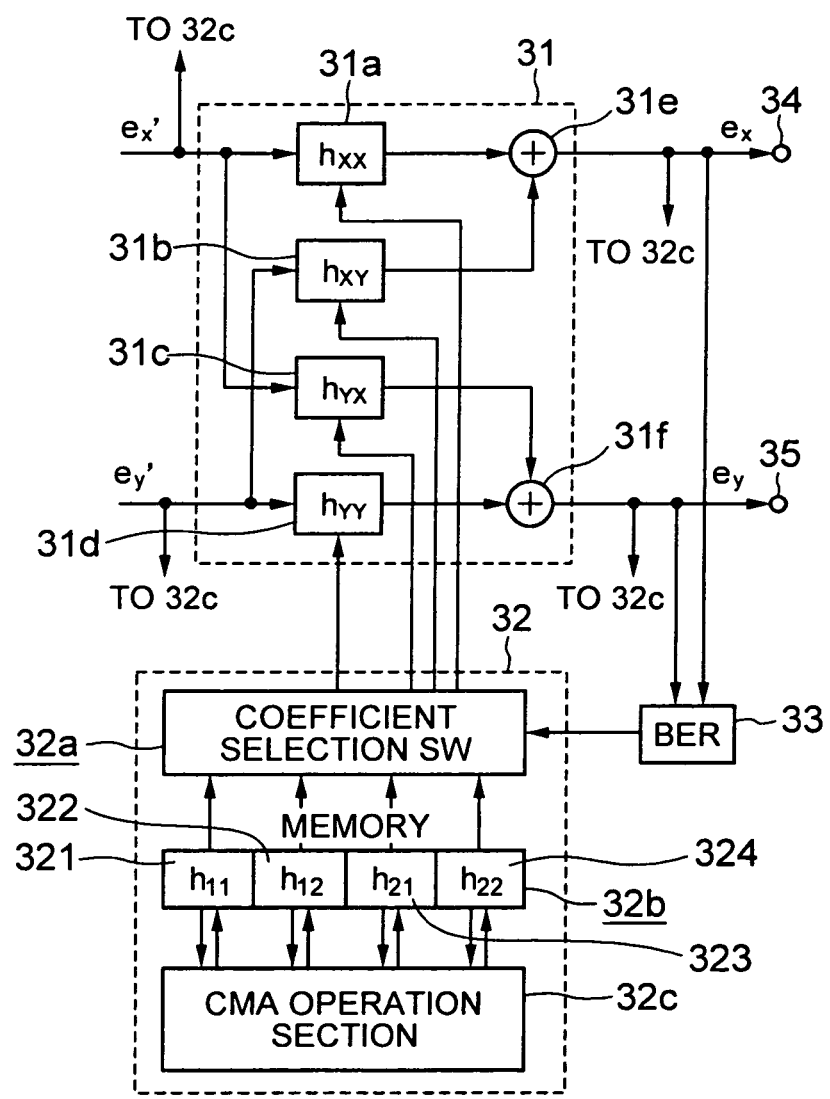
FIG. 2 is a block diagram showing the configuration of a digital signal processing chip shown in FIG. 1.
Figure 3:
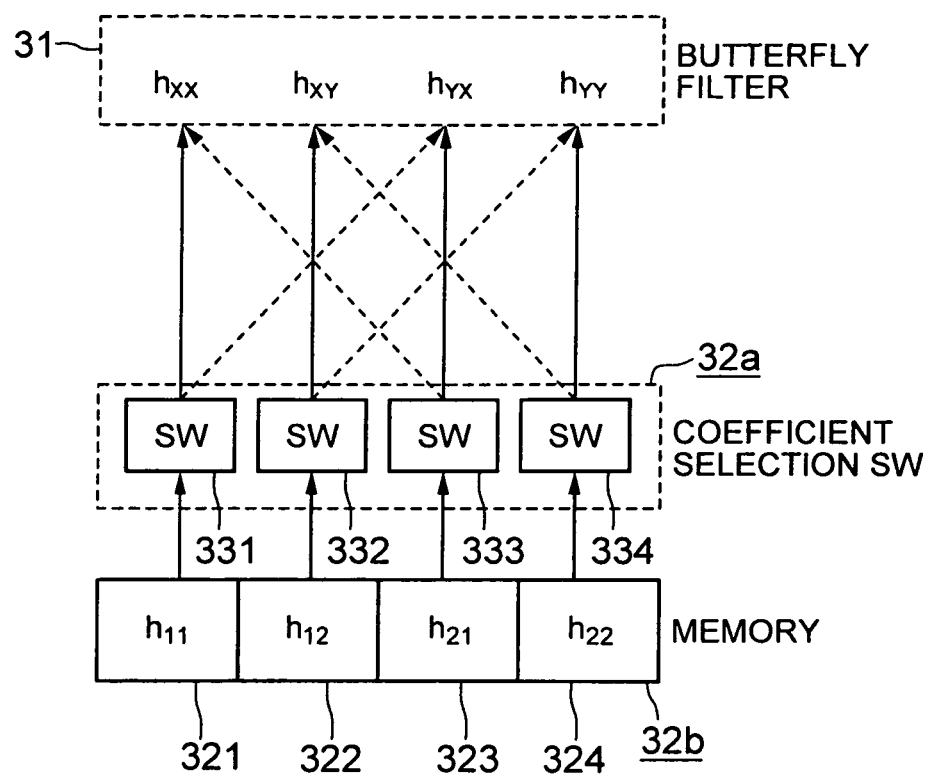
FIG. 3 is a block diagram for explaining an operation of the coefficient selection switch shown in FIG. 2.
Figure 4:
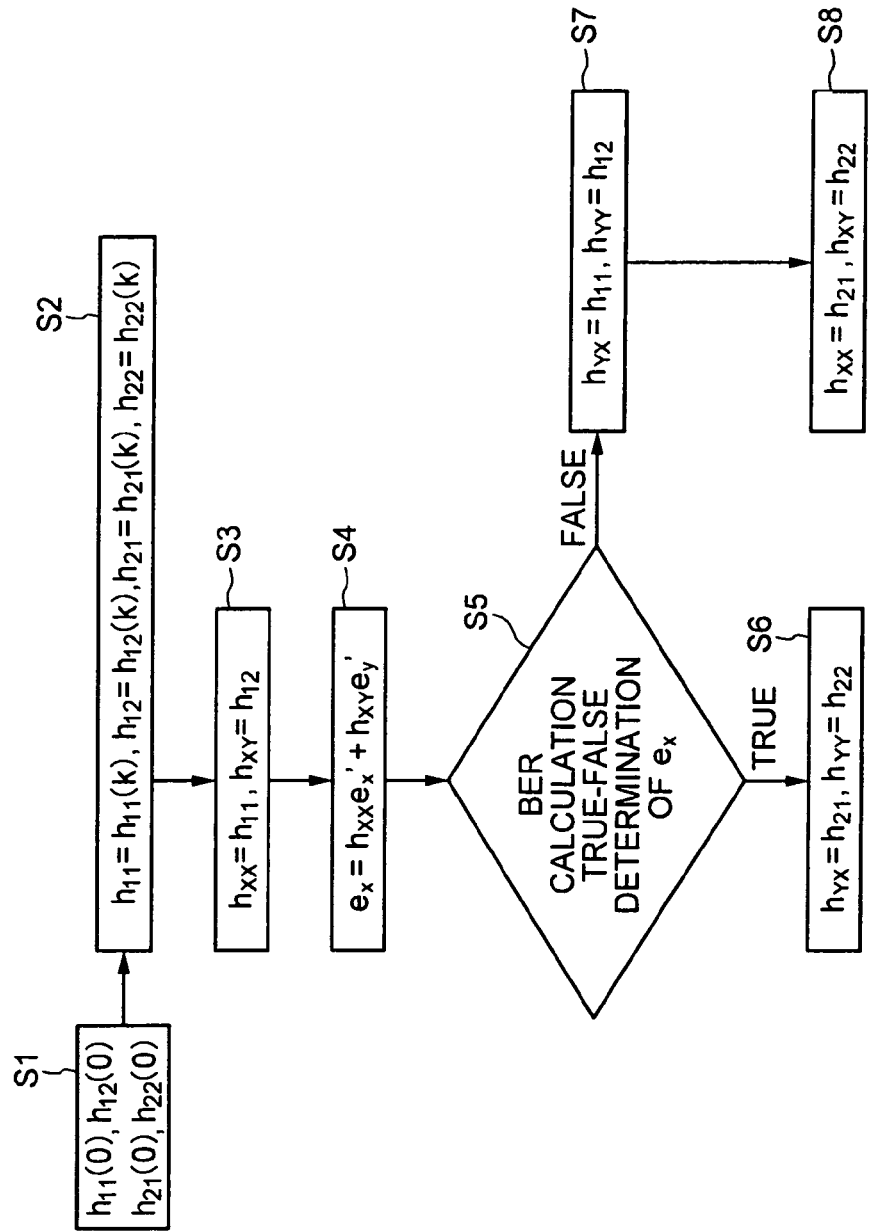
FIG. 4 is a sequence chart for explaining the initial setting of filter coefficients in the coherent receiver shown in FIG. 1.

A first exemplary embodiment of the present invention will be described with reference to FIGS. 1 to 4. FIG. 1 is a block diagram showing the configuration of a coherent receiver. FIG. 2 is a block diagram showing the configuration of the digital signal processing (DSP) chip shown in FIG. 1. FIG. 3 is a block diagram for explaining an operation of the coefficient selection switch (SW) shown in FIG. 2. FIG. 4 is a sequence chart for explaining the initial setting of filter coefficients in the coherent receiver shown in FIG. 1.

[Configuration]

It should be noted that the present embodiment is a specific example of a coherent receiver explained in a fifth exemplary embodiment described below. Referring to FIG. 1, a coherent receiver 1 according to the present embodiment includes an optical to electrical (O/E) converter (detection means) 10, an analog to digital (A/D) converter (quantization means) 20, and a digital signal processing (DSP) chip (signal processing means) 30. The O/E converter 10 includes a local light oscillator (LO) 11, a 90° hybrid 12, and photodetectors (PD) 13a and 13b. The DSP chip 30 includes a butterfly filter 31, a CMA block 32, and a BER (Bit Error Rate) block 33.

The coherent receiver 1 shown in the figure assigns a first transmission signal to first transmission polarization and assigns a second transmission signal to second transmission polarization, and receives a quadrature multiplexed signal generated by applying quadrature multiplexing to the first transmission polarization and the second transmission polarization.

For example, as described above, at a transmission terminal (input terminal), surfaces in which the field intensities $E_X$ and $E_Y$ of a dual optical signal oscillate are orthogonally crossed and entered into an optical fiber (not shown), and at a receiving terminal (output terminal) of the optical fiber, a quadrature multiplexed signal $S_{XY}=E_X+E_Y$, where the rotation angle $\theta$ is unknown, is output. The quadrature signal $S_{XY}$ is supplied to the coherent receiver 1.

As described below, the O/E converter 10 allows the quadrature signal $S_{XY}$ and a local light $L_{X'Y'}$ to interfere with each other to thereby obtain interference signals $E_X'$ and $E_Y'$. Then, the O/E converter 10 detects the interference signals $E_X'$ and $E_Y'$ and output them as detected signals. The detected signals are quantized by the A/D converter 20 and supplied to the DSP chip 30 as quantized signals $e_x'$ and $e_y'$.

As shown in FIG. 2, the butterfly filter 31 includes first to fourth multipliers 31a to 31d (respective coefficients are indicated as $h_{XX}$, $h_{XY}$, $h_{YX}$, $h_{YY}$), and first and second adders 31e and 31f. Further, the CMA block 32 includes a coefficient selection switch (SW) 32a, a coefficient storing memory 32b, and a CMA operation section 32c. In the example shown in the figure, the coefficient storing memory 32b includes first to fourth coefficient storing areas 321 to 324, in each of which a filter coefficient is stored. In this example, respective filter coefficients to be stored in the first, second, third, and fourth coefficient storing areas 321, 322, 323, and 324 are indicated as $h_{11}$, $h_{12}$, $h_{21}$, and $h_{22}$.

The DSP chip 30 performs filtering according to filter coefficients supplied from the CMA block 32 on the quantized signals $e_x'$ and $e_y'$. Then, the DSP chip 30 outputs demodulated signals $e_x$ and $e_y$ to the respective ports (output terminals) 34 and 35.

At this time, the demodulated signals $e_x$ and $e_y$ are supplied to the BER block 33. Then, the BER block 33 computes an error rate of at least one of the demodulated signals $e_x$ and $e_y$ to perform true-false determination. According to a result of the true-false determination, the coefficient selection SW 32a is controlled to switch, as described below. Further, the CMA block 33 receives the quantized signals $e_x'$ and $e_y'$ and the demodulated signals $e_x$ and $e_y$. Then, as described below, the CMA operation section 32c updates the filter coefficients by means of the CMA method according to the quantized signals $e_x'$ and $e_y'$ and the demodulated signals $e_x$ and $e_y$ and stores them in the coefficient storing memory 32b.

[Operation]

Next, an exemplary operation of the above-described coherent receiver 1 will be described with reference to FIGS. 1 to 4. First, referring to FIG. 1, as described above, the O/E converter 10 receives a quadrature signal $S_{XY}$ from an output terminal of an optical fiber, for example. The LO 11 oscillates the local light $S_{X'Y'}$. In the 90° hybrid 12, the quadrature signal $S_{XY}$ interferes with the local light $S_{X'Y'}$, and projected on arbitrary polarization planes X' and Y' of the local light. Then, the output lights (interference signals) $E_X'$ and $E_Y'$ of the 90° hybrid 12 are respectively supplied to the PDs 13a and 13b.

The PDs 13a and 13b respectively detect the output light $E_X'$ and $E_Y'$, and output them as detected signals which are electric signals. The detected signals include electric field information. The detected signals are quantized by the A/D converter 20, and supplied to the DSP chip 30 as quantized signals $e_x'$ and $e_y'$.

Referring to FIGS. 2 and 3, in the DSP chip 30, the butterfly filter 31 receives the quantized signals $e_x'$ and $e_y'$. The butterfly filter 31 receives filter coefficients from the CMA block 32 as described below. This means that as shown in FIG. 2, the first to fourth multipliers 31a to 31d receive filter coefficients stored in the coefficient storing memory 32b via the coefficient selection SW 32a.

As shown in FIG. 2, the quantized signal $e_x'$ is supplied to the first and third multipliers 31a and 31c. On the other hand, the quantized signal $e_y'$ is supplied to the second and fourth multipliers 31b and 31d. The first and third multipliers 31a and 31c respectively multiply the filter coefficients $h_{XX}$ and the filter coefficient $h_{YX}$ by the quantized signal $e_x'$ and output the resultants as first and third multiplied signals. The second and fourth multipliers 31b and 31d respectively multiply the filter coefficients $h_{XY}$ and the filter coefficient $h_{YY}$ by the quantized signal $e_y'$ and output the resultants as second and fourth multiplied signals. It should be noted that the suffixes x or y of the above filter coefficient h represents a number of either 1 or 2.

The first and second multiplied signals are supplied to the first adder 31e, and the third and fourth multiplied signals are supplied to the second adder 31f. The first adder 31e outputs a first added signal (demodulated signal) $e_x$, and the second adder 31f outputs a second added signal (demodulated signal) $e_y$.

As such, the demodulated signals $e_x$ and $e_y$, output from the butterfly filter 31, are represented by the following determinant shown as Expression 1.

$$\begin{bmatrix} e_x \\ e_y \end{bmatrix} = H \begin{bmatrix} e_x' \\ e_y' \end{bmatrix} = \begin{bmatrix} h_{XX} & h_{XY} \\ h_{YX} & h_{YY} \end{bmatrix} \begin{bmatrix} e_x' \\ e_y' \end{bmatrix} \quad \text{[Expression 1]}$$

The matrix H is a rotation matrix for canceling the rotation angle of the polarization axis between the transmission polarization plane XY and the reception polarization plane X'Y'. However, because the polarization axis is not determined to be unique, it is difficult to calculate the matrix H by estimating the rotation angle. As such, it is difficult to determine the filter coefficients $h_{XX}$, $h_{XY}$, $h_{YX}$, and $h_{YY}$. Accordingly, in the present embodiment, the respective elements (filter coefficients) of the matrix H are obtained using the CMA, as described below.

As shown in FIG. 3, the coefficient selection SW 32a includes four pieces of SW sections (for example, constituted of layer 2 switches (1×2 switches)) 331 to 334. As described above, the filter coefficients $h_{11}$, $h_{12}$, $h_{21}$, and $h_{22}$ are stored in the coefficient storing memory 32b. In the first selection mode described below, the respective SW sections 321 to 324 supply the filter coefficients $h_{11}$, $h_{12}$, $h_{21}$, and $h_{22}$ to the first to fourth multipliers 31a to 31d, respectively. This means that the SW sections 321 to 324 connect the coefficient storing areas 321 to 324 and the first to fourth multipliers 31a to 31d, respectively.

On the other hand, in the second selection mode described below, the respective SW sections 321 to 324 supply the filter coefficients $h_{11}$, $h_{12}$, $h_{21}$, and $h_{22}$ to the third, fourth, first and second multipliers 31c, 31d, 31a, and 31b, respectively. This means that the SW sections 321 to 324 connect the coefficient storing areas 321, 322, 323, and 324 and the third, fourth, first, and second multipliers 31c, 31d, 31a, and 31b, respectively.

Accordingly, as shown by the arrows of solid lines in FIG. 3, in the first selection mode, $h_{XX}=h_{11}$, $h_{XY}=h_{12}$, $h_{YX}=h_{21}$, and $h_{XY}=h_{22}$. Meanwhile, in the second selection mode, $h_{XX}=h_{21}$, $h_{XY}=h_{22}$, $h_{YX}=h_{11}$, and $h_{XY}=h_{12}$, as shown by the arrows of dashed lines.

The CMA operation section 32c calculates the filter coefficients of the next time using the filter coefficients $h_{11}$, $h_{12}$, $h_{21}$, and $h_{22}$ stored in the coefficient storing memory 32b. As such, if filter coefficients at a time k (k represents an integer of 0 or larger) are represented as $h_{11}(k)$, $h_{12}(k)$, $h_{21}(k)$, and $h_{22}(k)$, the CMA operation section 32c calculates the filter coefficients at a time (k+1), namely $h_{11}(k+1)$, $h_{12}(k+1)$, $h_{21}(k+1)$, and $h_{22}(k+1)$, according to the following Expression 2. If a FIR filter is used, a matrix h (suffix is omitted) represents a tap coefficient of the FIR filter.

$$h_{11}(k+1)=h_{11}(k)+\mu\epsilon_x e_x(k)\overline{e_x'}(k)$$

$$h_{12}(k+1)=h_{12}(k)+\mu\epsilon_x e_x(k)\overline{e_y'}(k)$$

$$h_{21}(k+1)=h_{21}(k)+\mu\epsilon_y e_y(k)\overline{e_x'}(k)$$

$$h_{22}(k+1)=h_{22}(k)+\mu\epsilon_y e_y(k)\overline{e_y'} \quad \text{[Expression 2]}$$

$$\epsilon_x=1-|e_x'(k)|^2, \epsilon_y=1-|e_y'(k)|^2 \quad \text{[Expression 3]}$$

The CMA controls to keep the intensity (amplitude) of the quantized signal $e_x'$ (or $e_y'$) constant using error functions $\epsilon_x$ and $\epsilon_y$. Accordingly, it is impossible to distinguish whether the data in the quantized signal is of X polarization or Y polarization only with the field intensity information.

As such, as described above, it may happen that the quantized signal $e_x'$ is converged at the demodulated signal $e_y$ and the quantized signal $e_y'$ is converged at the demodulated signal $e_x$ by the filter coefficients $h_{11}$ to $h_{22}$. As such, there is a case where the modulated signals $e_y$ and $e_x$ are respectively output from the port 34 and the port 35 shown in FIG. 1. In the present embodiment, in order to prevent such a phenomenon (referred to as port switching phenomenon), filer coefficient switching control is performed as described below.

The port switching phenomenon is not caused each time the filter coefficients are updated. It is only necessary to supply correct filter coefficients to the butterfly filter 31 first, and then update the filter coefficients according to Equation 2. As such, in this example, before beginning data communication (hereinafter referred to as at the time of training), the filter coefficients $h_{XX}$, $h_{XY}$, $h_{YX}$, and $h_{YY}$ are controlled such that the quantized signals $e_x'$ and $e_y'$ are converged at the demodulated signals $e_x$ and $e_y$ (hereinafter, this control is referred to as a training control method).

In this example, as a quadrature signal, at least one of the first and second transmission signals in which data series has been known (a signal of prescribed data series) is transmitted.

For example, a signal, in which a data series obtained as a demodulated signal $e_x$ has been known, is transmitted.

As shown in FIG. 1, the demodulated signals $e_x$ and $e_y$ of the butterfly filter 31 are supplied to the BER block 33. It should be noted that the BER block 33 has known the data series of the demodulated signal $e_x$ so as to be able to perform true-false determination of the demodulated signal output to the port 34.

First, with an instruction from the BER block 33, the coefficient selection SW 32a is in the first selection mode. As such, $h_{XX}=h_{11}$, $h_{XY}=h_{12}$, $h_{YX}=h_{21}$, and $h_{YY}=h_{22}$, as shown by the arrows of solid lines in FIG. 3.

Referring to FIG. 4, the CMA operation section 32c first supplies $h_{11}=h_{11}(0)$, $h_{12}=h_{12}(0)$, $h_{21}=h_{21}(0)$, and $h_{22}=h_{22}(0)$ as initial values to the coefficient storing memory 32b (step S1). Then, the CMA operation section 32c calculates $h_{11}=h_{11}(k)$, $h_{12}=h_{12}(k)$, $h_{21}=h_{21}(k)$, and $h_{22}=h_{22}(k)$ using Expression 2 (step S2), and determines $h_{11}=h_{11}(k)$ and $h_{12}=h_{12}(k)$ to be the filter coefficients $h_{XX}$ and $h_{XY}$ of the butterfly filter 31 (step S3).

As described above, once the filter coefficients $h_{XX}$ and $h_{XY}$ are determined, as the quantized signal $e_x'$ has been known, the demodulated signal $e_x$ can be calculated according to the above Expression 1, that is, the following Expression 4. Then, a signal appearing on the port 34 is tentatively determined to be a signal $e_x$ (step S4).

$$e_x=h_{XX}\overline{e_x'}+h_{XY}\overline{e_y'} \quad \text{[Expression 4]}$$

The tentatively determined signal $e_x$ is supplied to the BER block 33. The BER block 33 compares the original demodulated signal $e_x$ with the tentatively determined signal $e_x$ to calculate an error rate thereof. In this case, if there is no error (error rate=zero), the tentatively determined signal $e_x$ is determined to be true. On the contrary, if the error rate is ½ or higher, the tentatively determined signal $e_x$ is determined to be false (step S5).

If the tentatively determined signal $e_x$ is true, it is found that there is no error in the setting of the filter coefficient. As such, the remaining filter coefficients $h_{21}=h_{21}(k)$ and $h_{22}=h_{22}(k)$ are supplied to the butterfly filter 31 as the filter coefficients $h_{YX}$ and $h_{YY}$ (step S6).

On the other hand, if the tentatively determined signal $e_x$ is determined to be false, it is found that the tentatively determined signal $e_x$ is a demodulated signal $e_y$. The BER block 33 controls the coefficient selection SW 32a to take the second selection mode. As a result, $h_{11}=h_{11}(k)$ and $h_{12}=h_{12}(k)$ are respectively supplied to the butterfly filter 31 as filter coefficients $h_{YX}$ and $h_{YY}$ (step S7).

Once the filter coefficients $h_{YX}$ and $h_{YY}$ are determined, as the quantized signals $e_x'$ and $e_y'$ have been known, a demodulated signal $e_y$ is obtained according to Expression 1, that is, the following Expression 5, and the demodulated signal $e_y$ is output to the port 35.

$$e_y=h_{YX}\overline{e_x'}+h_{YY}\overline{e_y'} \quad \text{[Expression 5]}$$

Then, the remaining $h_{21}=h_{21}(k)$ and $h_{22}=h_{22}(k)$ are supplied as filter coefficients $h_{XX}$ and $h_{XY}$ to the butterfly filter 31 via the coefficient selection SW 32a (step S8).

As described above, as the filter coefficients are selected by the CMA block 32 according to the calculation result of the bit error rate of the tentatively determined signal $e_x$, it is possible to reliably output the demodulated signals $e_x$ and $e_y$ from the ports 34 and 35, respectively.

Second Exemplary Embodiment

Next, a second exemplary embodiment of the present invention will be described with reference to FIGS. 5 to 7.

Figure 5:
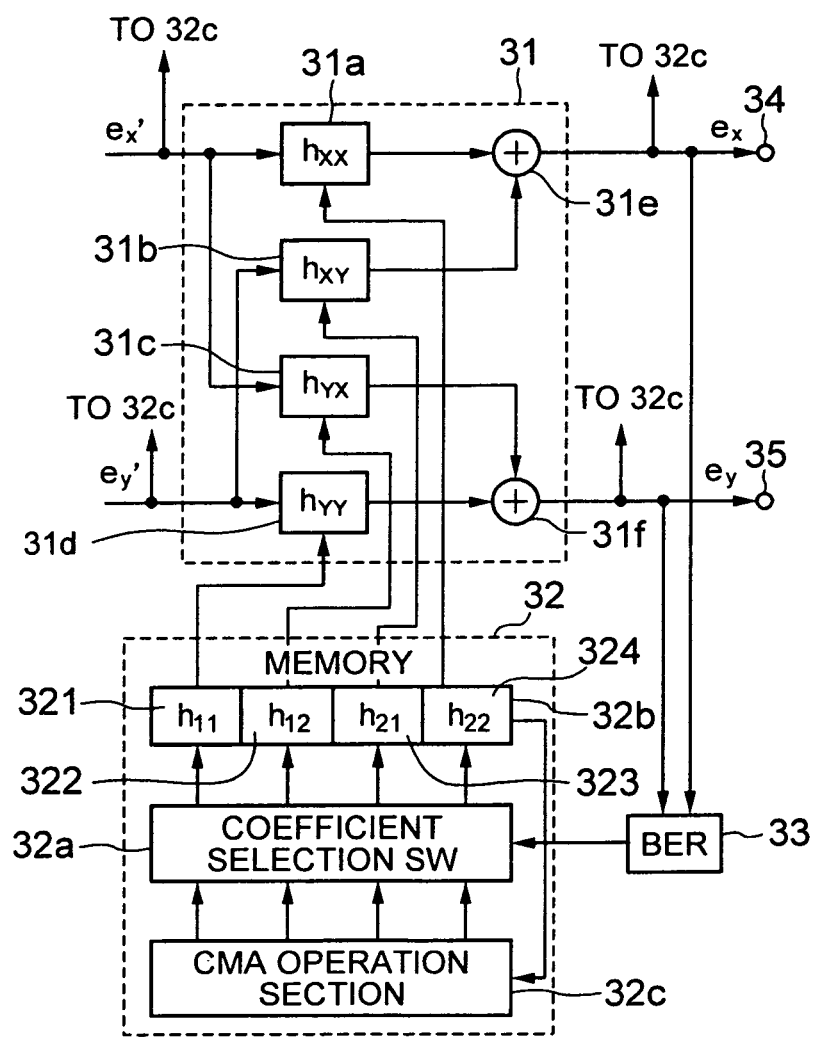
FIG. 5 is a block diagram showing the configuration of a digital signal processing chip used in a coherent receiver according to a second exemplary embodiment of the present invention.

FIG. 5 is a block diagram showing another exemplary configuration of a digital signal processing (DSP) chip shown in FIG. 1. FIG. 6 is a block diagram for explaining an operation of the coefficient selection SW shown in FIG. 5. FIG. 7 is a sequence chart for explaining another example of initial setting of filter coefficients in the coherent receiver shown in FIG. 1.

The DSP chip 30 shown in FIG. 5 is used in the coherent receiver shown in FIG. 1. In FIG. 5, the same constitutional elements as those of the example shown in FIG. 2 are denoted by the same reference numerals. The example shown in FIG. 5 is different from the example of FIG. 2 in that the coefficient selection SW 32a is disposed between the CMA operation section 32a and the coefficient storing memory 32b. As such, in the example of FIG. 5, filter coefficients stored in the coefficient storing memory 32b are directly supplied to the butterfly filter 31.

Figure 6:
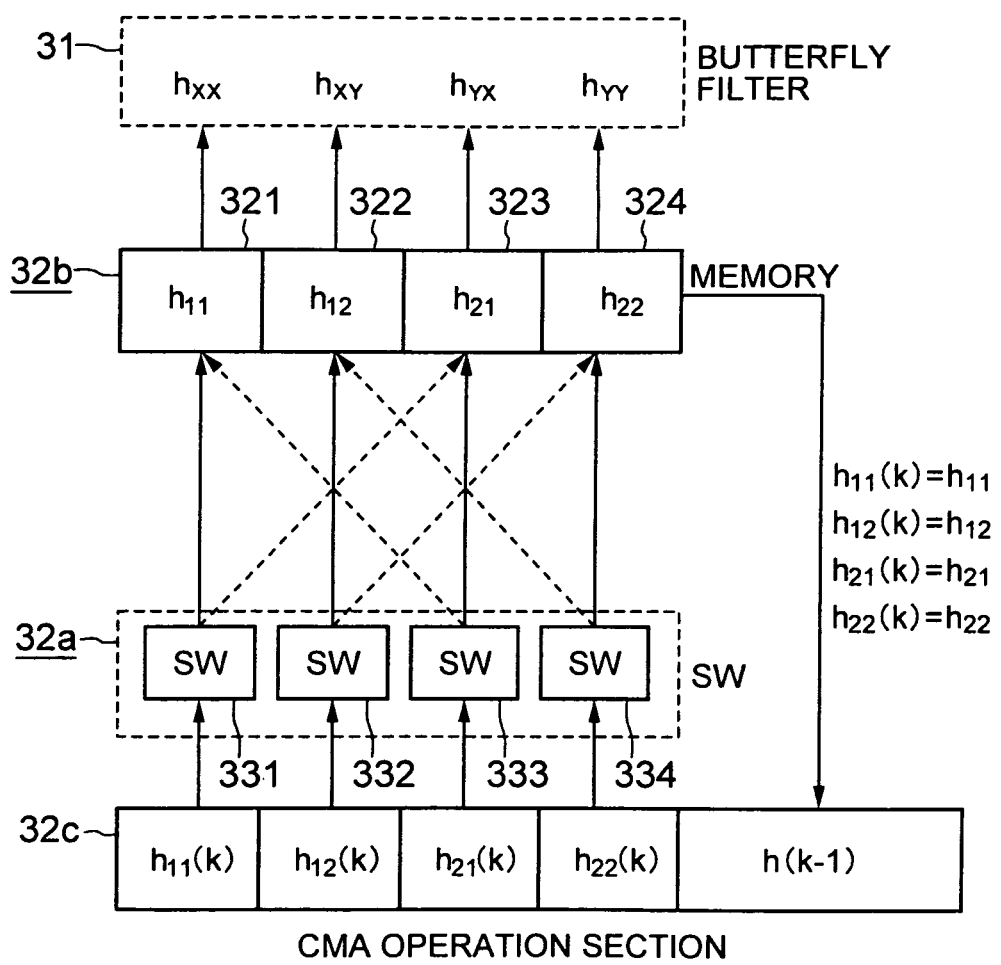
FIG. 6 is a block diagram for explaining an operation of a coefficient selection switch used in the coherent receiver according to the second exemplary, embodiment of the present invention.
Figure 7:
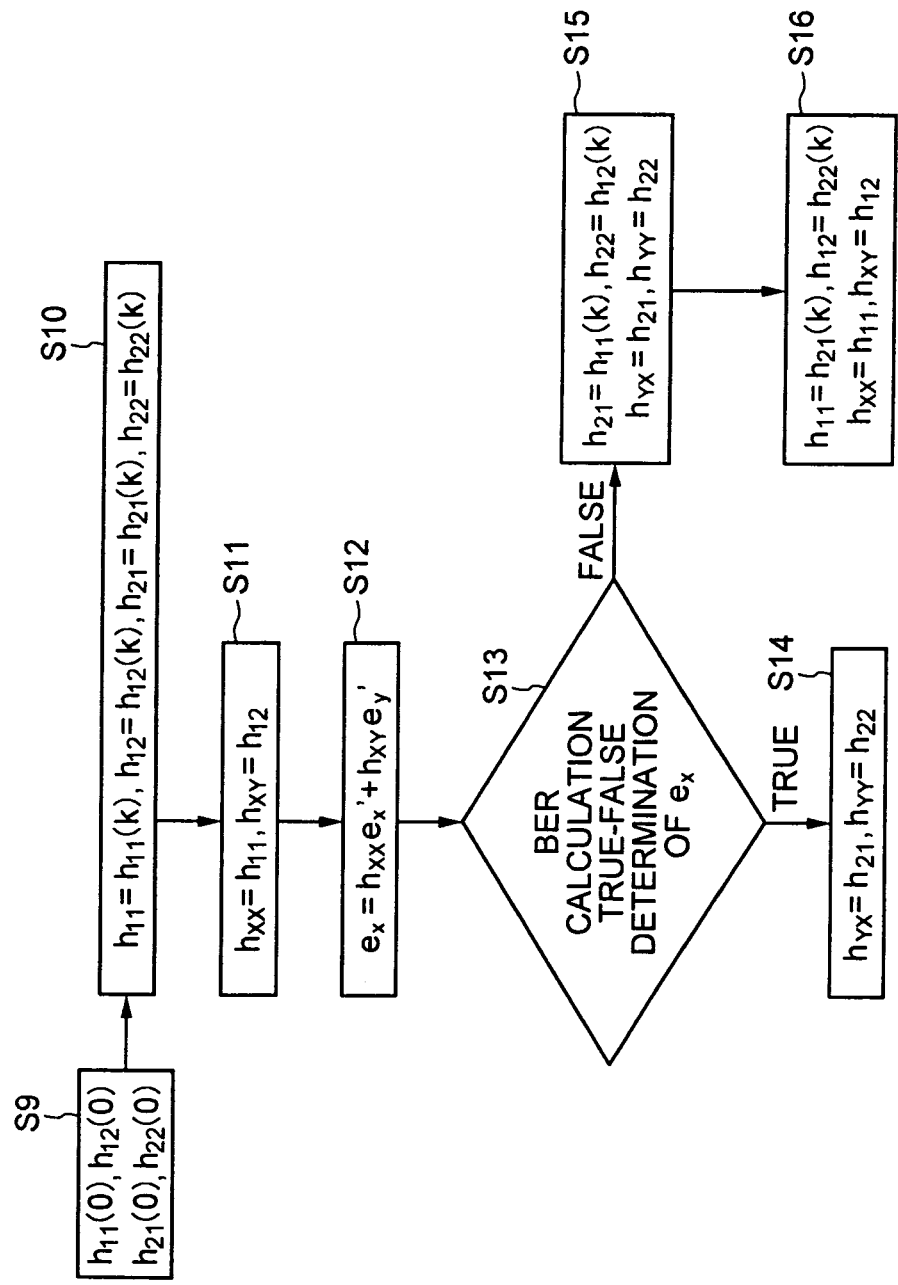
FIG. 7 is a sequence chart for explaining the initial setting of filter coefficients in the coherent receiver according to the second exemplary embodiment of the present invention.

Referring to FIGS. 5 and 6, in the DSP chip 30, the butterfly filter 31 receives the above-described quantized signals $e_x'$ and $e_y'$. In the example shown, the first to fourth multipliers 31a to 31d are respectively connected with the coefficient storing areas 321 to 324 (that is, the butterfly filter 31 and the coefficient storing memory 32b are connected such that $h_{11}=h_{XX}$, $h_{12}=h_{XY}$, $h_{21}=h_{YX}$, and $h_{22}=h_{YY}$ are supplied to the butterfly filter 31. The butterfly filter 31 receives the filter coefficients $h_{11}$, $h_{12}$, $h_{21}$, and $h_{22}$ stored in the coefficient storing memory 32b, and performs operation according to Expression 1 to output the demodulated signals $e_x$ and $e_y$.

As shown in FIG. 6, the CMA operation section 32c reads the filter coefficients stored in the coefficient storing memory 32b, and performs operation according to the CMA based on Expression 2. This means that the CMA operation section 32c updates the filter coefficients. Then, the CMA operation section 32c writes the updated filter coefficients into the coefficient storing memory 32b via the coefficient selection SW 32a.

As described above, the CMA operation section 32c calculates filter coefficients of the next time using the filter coefficients $h_{11}$, $h_{12}$, $h_{21}$, and $h_{22}$ stored in the coefficient storing memory 32b. This means that the CMA operation section 32c reads $h_{11}(k)=h_{11}$, $h_{12}(k)=h_{12}$, $h_{21}(k)=h_{21}$, and $h_{22}(k)=h_{22}$ as filter coefficients at a time (k−1), from the coefficient storing memory 32b. Then, the CMA operation section 32c calculates the filter coefficients $h_{11}(k)$, $h_{12}(k)$, $h_{21}(k)$, and $h_{22}(k)$ at a time k based on Expression 2.

In the example shown in FIG. 6, in the first selection mode, the SW sections 331 to 334 determine the filter coefficients $h_{11}(k)$, $h_{12}(k)$, $h_{21}(k)$, and $h_{22}(k)$ to be the filter coefficients $h_{11}$, $h_{12}$, $h_{21}$, and $h_{22}$ of the coefficient storing memory 32b, respectively (shown by the arrows of solid lines). On the other hand, in the second selection mode, the SW sections 331 to 334 determine the filter coefficients $h_{11}(k)$, $h_{12}(k)$, $h_{21}(k)$, and $h_{22}(k)$ to be the filter coefficients $h_{21}$, $h_{22}$, $h_{11}$, and $h_{12}$ of the coefficient storing memory 32b, respectively (shown by the arrows of dashed lines).

Accordingly, in the example shown in FIG. 6, in the first selection mode, $h_{XX}=h_{11}(k)$, $h_{XY}=h_{12}(k)$, $h_{YX}=h_{21}(k)$, and $h_{YY}=h_{22}(k)$. On the other hand, in the second selection mode, $h_{XX}=h_{21}(k)$, $h_{XY}=h_{22}(k)$, $h_{YX}=h_{11}(k)$, and $h_{YY}=h_{12}(k)$.

Now, a training control method according to the second exemplary embodiment will be described with reference to FIG. 7. In this example, it is assumed that a known data series of at least one of the first and second transmission signals constituting a quadrature signal is transmitted (in this case, the first transmission signal $E_X$ is assumed to be a known data series). First, $h_{11}=h_{11}(0)$, $h_{12}=h_{12}(0)$, $h_{21}=h_{21}(0)$, and $h_{22}=h_{22}(0)$ are supplied to the coefficient storing memory 32b as initial values (step S9). Then, as described above, the CMA operation section 32c calculates $h_{11}=h_{11}(k)$, $h_{12}=h_{12}(k)$, $h_{21}=h_{21}(k)$, and $h_{22}=h_{22}(k)$ using Expression 2 (step S10). Then, $h_{11}=h_{11}(k)$ and $h_{12}=h_{12}(k)$ are determined to be the filter coefficients $h_{XX}$ and $h_{XY}$ of the butterfly filter 31 (step S11).

As described above, once the filter coefficients $h_{XX}$ and $h_{XY}$ are determined, as the quantized signal $e_x'$ has been known, a demodulated signal $e_x$ can be calculated according to the above Expression 4. Then, a signal appearing on the port 34 is tentatively determined to be a signal $e_x$ (step S12).

The tentatively determined signal $e_x$ is supplied to the BER block 33. The BER block 33 compares the original output signal $e_x$ with the tentatively determined signal $e_x$ to calculate an error rate thereof. In this case, if there is no error (error rate=zero), the tentatively determined signal $e_x$ is determined to be true. On the contrary, if the error rate is ½ or higher, the tentatively determined signal $e_x$ is determined to be false (step S13).

If the tentatively determined signal $e_x$ is true, it is found that there is no error in the setting of the filter coefficients. As such, by the first selection mode, the remaining filter coefficients $h_{21}=h_{21}(k)$ and $h_{22}=h_{22}(k)$ are supplied to the butterfly filter 31 as the filter coefficients $h_{YX}$ and $h_{YY}$ (step S14).

On the other hand, if the tentatively determined signal $e_x$ is determined to be false, it is found that the tentatively determined signal $e_x$ is a demodulated signal $e_y$. The BER block 33 controls the coefficient selection SW 32a to take the second selection mode. As a result, $h_{11}=h_{11}(k)$ and $h_{12}=h_{12}(k)$ are respectively supplied as filter coefficients $h_{YX}$ and $h_{YY}$ to the butterfly filter 31 (step S15).

Once the filter coefficients $h_{YX}$ and $h_{YY}$ are determined, as the quantized signals $e_x'$ and $e_y'$ have been known, a demodulated signal $e_y$ is obtained according to the above Expression 5, and the demodulated signal $e_y$ is output to the port 35.

In $h_{11}$ and $h_{12}$ of the coefficient storing memory 32, $h_{21}(k)$ and $h_{22}(k)$ are stored, respectively. As such, the remaining $h_{21}=h_{21}(k)$ and $h_{22}=h_{22}(k)$ are supplied as filter coefficients $h_{XX}$ and $h_{XY}$ to the butterfly filter 31 (step S16).

As described above, as the filter coefficients are selected by the CMA block 32 according to the calculation result of the bit error rate of the tentatively determined signal $e_x$, it is possible to reliably output the demodulated signals $e_x$ and $e_y$ from the ports 34 and 35, respectively.

Third Exemplary Embodiment

Figure 8:
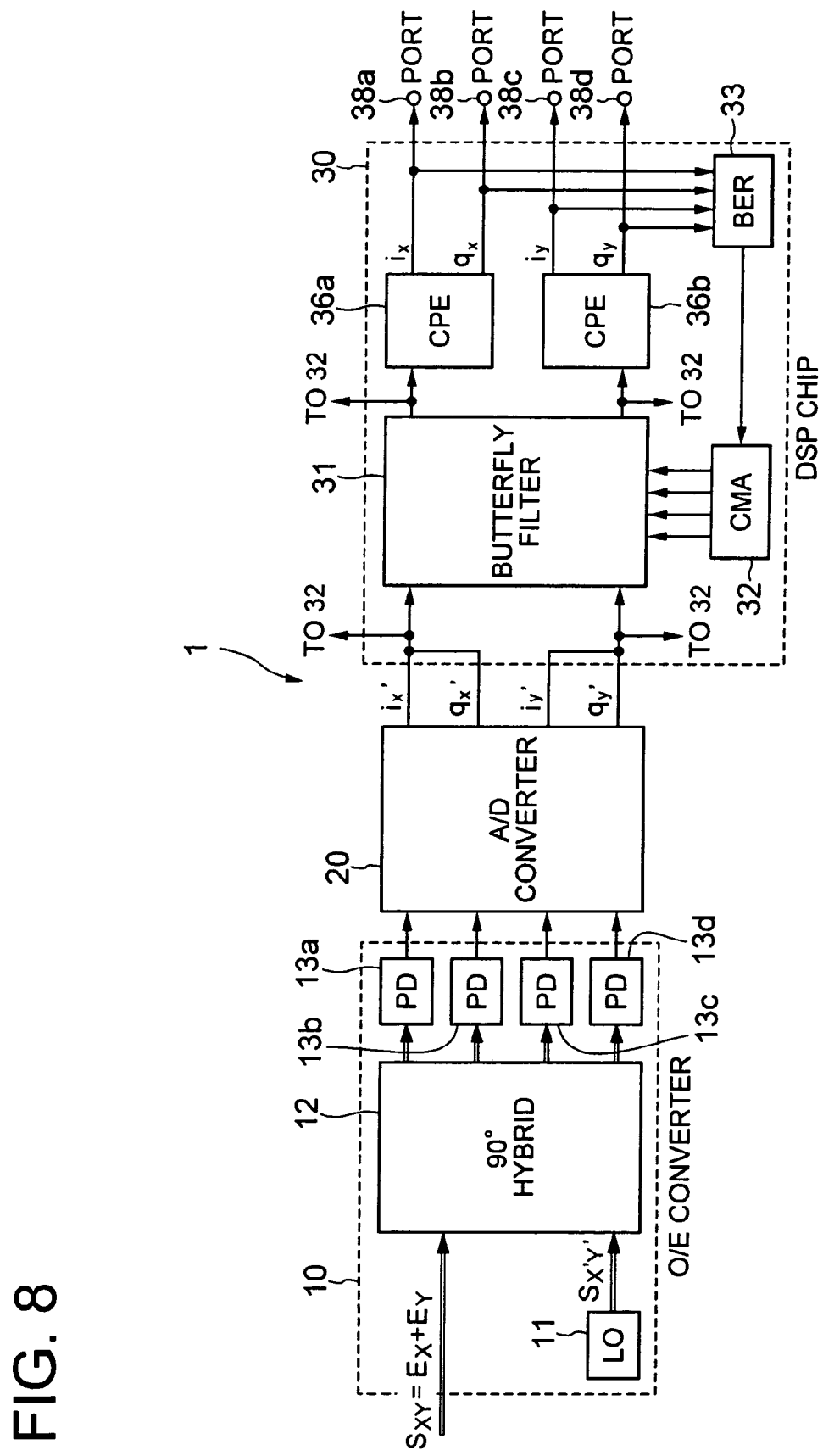
FIG. 8 is a block diagram showing the configuration of a coherent receiver according to a third exemplary embodiment of the present invention.
Figure 9:
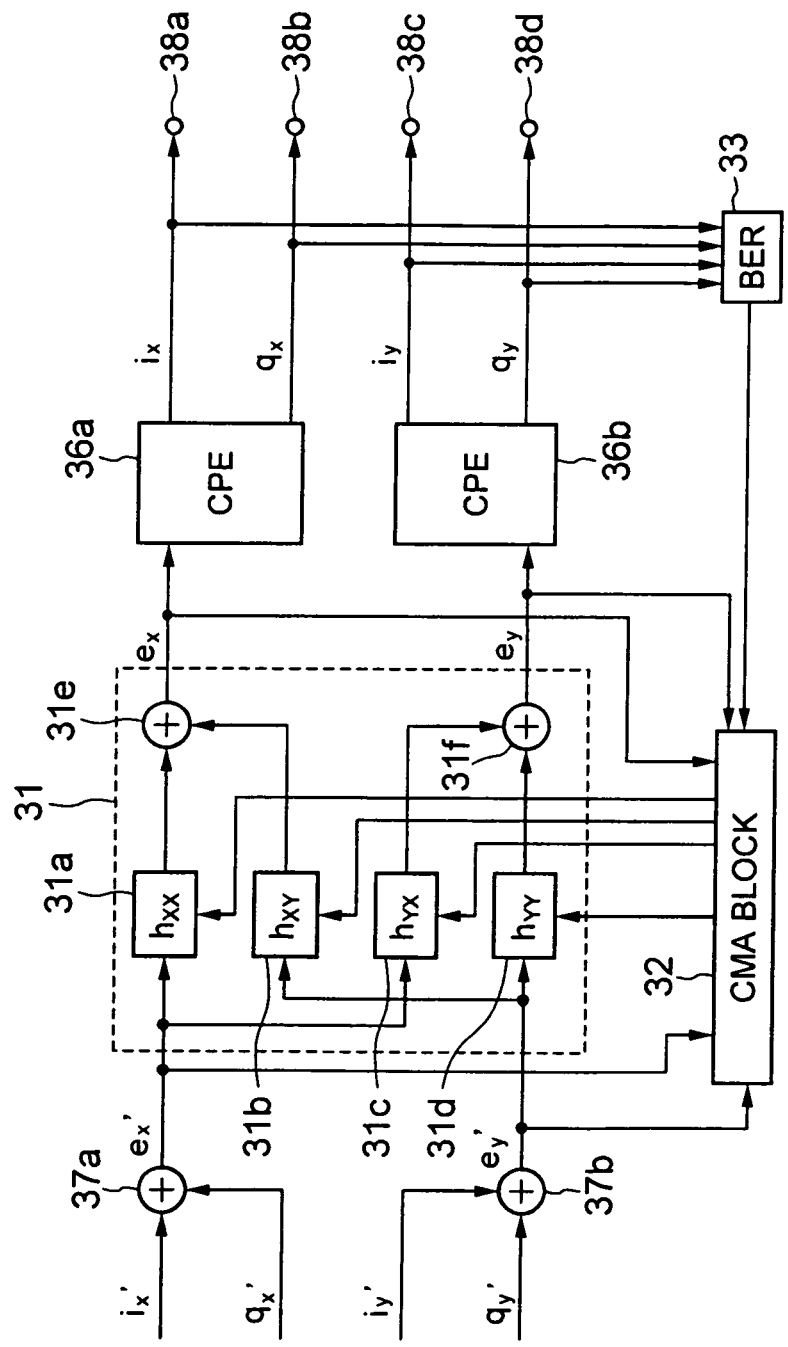
FIG. 9 is a block diagram showing the butterfly filter shown in FIG. 8 in detail.

Next, a third exemplary embodiment of the present invention will be described with reference to FIGS. 8 and 9. FIG. 8 is a block diagram showing the configuration of a coherent receiver according to the present embodiment. FIG. 9 is a block diagram showing the butterfly filter shown in FIG. 8 in detail. It should be noted that in FIG. 8, the same constituent elements as those shown in FIG. 1 are denoted by the same reference numerals.

Referring to FIG. 8, the coherent receiver 1 according to the third exemplary embodiment receives a QPSK-modulated quadrature signal as a quadrature signal. The coherent receiver 1 includes an optical to electrical (O/E) converter 10, an analog to digital (A/D) converter 20, and a digital signal processing (DSP) chip 30. In the present embodiment, the O/E converter also includes PDs 13c and 13d. Further, the CMA block 32 also includes carrier phase estimation (CPE) sections 36a and 36b.

As described relating to FIG. 1, the O/E converter 10 receives a quadrature signal $S_{XY}$ from the output terminal of an optical fiber, for example. In the 90° hybrid 12, the quadrature signal $S_{XY}$ interferes with the local light $S_{X'Y'}$, and projected on arbitrary polarization planes X' and Y' of the local light. Further, the O/E converter 10 detects the phases of the quadrature signal $S_{XY}$ and the local light $S_{X'Y'}$ and supplies the output lights $I_{X'}$, $Q_{X'}$, $I_{Y'}$, and $Q_{Y'}$ to the PDs 13a, 13b, 13d, and 13c, respectively.

The PDs 13a, 13b, 13c, and 13d respectively detect the output lights $I_{X'}$, $Q_{X'}$, $I_{Y'}$, and $Q_{Y'}$, and output them as detected signals. These detected signals include field information. The detected signals are quantized by the A/D converter 20, and supplied as quantized signals $i_x'$, $q_x'$, $i_y'$, and $q_y'$ to the DSP chip 30.

Referring to FIGS. 8 and 9, in the previous stage of the butterfly filter 31, adders 37a and 37b are disposed (adders 37a and 37b are not shown in FIG. 8). The adder 37a receives the quantized signals $i_x'$ and $q_x'$, and the adder 37b receives the quantized signals $i_y'$ and $q_y'$. The the adders 37a and 37b respectively output added signals $e_x'$ and $e_y'$. As such, by the adders 37a and 37b, the signals are combined into $e_x' = i_x' + q_x'$ and $e_y' = i_y' + q_y'$, for each polarization. Then, these added signals $e_x'$ and $e_y'$ are supplied to the butterfly filter 31.

As described relating to FIGS. 2 and 5, the butterfly filter 31 performs filtering and outputs demodulated signals $e_x$ and $e_y$. The demodulated signals $e_x$ and $e_y$ are respectively input to the CPE sections 36a and 36b. The CPE sections 36a and 36b extract phase information from the respective demodulated signals $e_x$ and $e_y$ obtained through the CMA operation. Then, the CPE section 36a separates channel signals $i_x$ and $q_x$ of an I channel (In Phase) and a Q channel (Quadrature Phase) from the demodulated signal $e_x$ of X polarization. Meanwhile, the CPE section 36b separates channel signals $i_y$ and $q_y$ of the I channel and the Q channel from the output signal $e_x$ of Y polarization. These channel signals $i_x$, $q_x$, $i_y$, and $q_y$ are respectively output from the ports 38a to 38d.

As described above, with the CMA, the added signals $e_x'$ and $e_y'$ may erroneously be converged at demodulated signals $e_x$ and $e_y$, respectively. In the example shown in the figures, the CPE operation only recognizes four symbols in which the phases are shifted by $\pi/2$. This means that in the CPE operation, the relationships between the respective symbols and transmitted data signals cannot be identified. As such, it is impossible to distinguish whether the data in a quantized signal is of X polarization or Y polarization. Accordingly, even in the CPE operation, there is a possibility that the quantized signal $i_x'$ (or $i_y'$) is erroneously converged at the channel signal $q_x$ (or $q_y$) and the quantized signal $q_x'$ (or $q_y'$) is erroneously converged at the channel signal $i_x$ (or $i_y$).

Here, a training control method in the case of using QPSK modulation will be described. In FIG. 8, the coherent receiver 1 receives two known signals of different series, which are $E_X = I_X + Q_X$ and $E_Y = I_Y + Q_Y$. At this time, signals to be transmitted are set such that $E_X$ and $E_Y$ become binary signals. For example, while $E_X$ and $E_Y$ are originally QPSK signals, in the case of training control, BPSK (Binary Phase Shift Keying) signals are transmitted. The quantized signals $i_x'$, $q_x'$, $i_y'$, and $q_y'$ obtained from the signals $E_X$ and $E_Y$ are combined to be added signals $e_x'$ and $e_y'$ for each polarization by the DSP chip 30, whereby the demodulated signals $e_x$ and $e_y$, tentatively determined by the butterfly filter 31, are obtained.

As the demodulated signals $e_x$ and $e_y$ are binary signals, control is performed by the CPE operation such that the signals are output as $i_x$ and $i_y$ (or $q_x$ and $q_y$) described above. Thereby, it is possible to output the signal $e_x$ to the port 38a (or port 38b) and output the signal $e_y$ to the port 38c.

At this time, the BER block 33 calculates error rates of the channel signals $i_x$, $q_x$, $i_y$, and $q_y$, that is, the demodulated signals $e_x$ and $e_y$, and performs true-false determination as described above. Further, as described relating to FIG. 4, the CMA block 32 performs training control on the filter coefficients $h_{XX}$, $h_{XY}$, $h_{YX}$, and $h_{YY}$.

In this way, even when the signals of X polarization and Y polarization are processed by multilevel modulation such as QPSK modulation, as binary modulation is used when performing training control so as to select filter coefficients in the CMA block 32 in accordance with a result of calculating a bit error rate of the tentatively determined signal ex, the respective demodulated signals $e_x$ and $e_y$ can be output from the ports reliably.

Fourth Exemplary Embodiment

Figure 10:
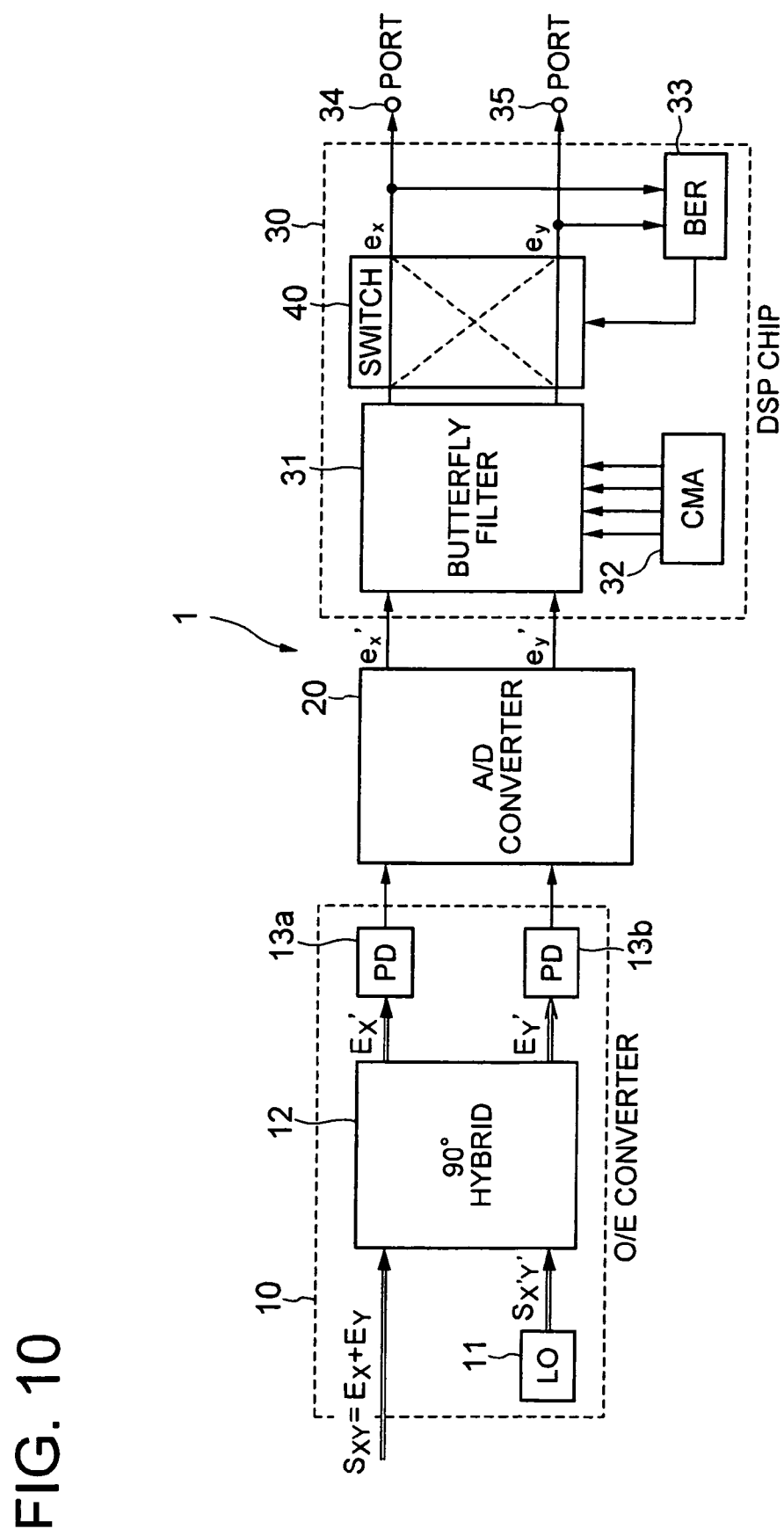
FIG. 10 is a block diagram showing the configuration of a coherent receiver according to a fourth exemplary embodiment of the present invention.

A fourth exemplary embodiment of the present invention will be described with reference to FIG. 10. FIG. 10 is a block diagram showing the configuration of a coherent receiver according to the fourth exemplary embodiment. In FIG. 10, the same constituent elements as those shown in FIG. 1 are denoted by the same reference numerals.

Referring to FIG. 10, a coherent receiver 1 according to the present invention includes an optical to electrical (O/E) converter 10, an analog to digital (A/D) converter 20, and a digital signal processing (DSP) chip 30. In the fourth exemplary embodiment, the CMA block 32 also includes a port control switch 40. The port control switch 40 operates under the control of the BER section 33, as described below.

As described relating to FIG. 1, the O/E converter 10 receives a quadrature signal $S_{XY} = E_X + E_Y$ from the output terminal of an optical fiber, for example. In the 90° hybrid 12, the quadrature multiplexed signal $S_{XY}$ interferes with a local light $S_{X'Y'}$, and projected on arbitrary polarization planes X' and Y' of the local light. Then, the interference signals $E_{X'}$ and $E_{Y'}$ are supplied to the PDs 13a and 13b.

The PDs 13a and 13b respectively detect the interference signals $E_{X'}$ and $E_{Y'}$, and output them as detected signals. These detected signals include field information. The detected signals are quantized by the A/D converter 20, and supplied as quantized signals $e_x'$ and $e_y'$ to the DSP chip 30.

As described above, in the DSP chip 30, the butterfly filter 31 receives the above-described quantized signals $e_x'$ and $e_y'$. The butterfly filter 31 outputs the demodulated signals $e_x$ and $e_y$ based on the above-described Expression 1.

As described in the first exemplary embodiment, there is a possibility that the demodulated signals $e_y$ and $e_x$ are output from the ports 34 and 35, respectively. A training control method for preventing such a port switching phenomenon will be described.

In FIG. 10, the coherent receiver 1 receives two known transmission signals $E_X$ and $E_Y$ of different series. As described above, the quantized signals $e_x'$ and $e_y'$ obtained from $E_X$ and $E_Y$ are processed by the CMA operation by the DSP chip 30 and output as tentatively determined signals $e_x$ and $e_y$. At this moment, the tentatively determined signals $e_x$ and $e_y$ are connected with the ports 34 and 35, respectively (connections indicated by solid lines).

The tentatively determined signals $e_x$ and $e_y$ are supplied to the BER block 33. As described above, the BER block 33 knows the data series of the tentatively determined signal $e_x$ in advance. As such, the BER block 33 is able to perform true-false determination of the demodulated signal output to the port 34.

In the way as described above, when the BER block 33 performs true-false determination and determines that it is false, it is found that the tentatively determined signal $e_x$ is actually a demodulated signal $e_y$. As such, when determining that the signal is false, the BER block 33 controls the port control switch 40 to connect the tentatively determined signals $e_x$ and $e_y$ with the ports 35 and 34, respectively (connections indicated by dashed line).

In this way, as the BER block 33 controls switching of the port control switch 40 according to the error rate of the tentatively determined signal, the demodulated signals $e_x$ and $e_y$ can be output reliably from the ports 34 and 35, respectively.

While the methods of determining filter coefficients using the CMA have been described in the above-described first to fourth exemplary embodiments, it is also possible to use algorithms for determining filter coefficients of a butterfly filter such as LMS (Lease Mean Square) algorithm, rather than CMA. Further, as a modulation method to be used for polarization multiplexing, not only OOK, BPSK, and QPSK but also other multilevel modulation methods such as 8 PSK and 16 QAM (Quadrature Amplitude Modulation) may be applied. In any case, the coherent receiver described in any of the first to fourth exemplary embodiments can be applied to a receiver which assigns a first transmission signal to first transmission polarization, assigns a second transmission signal to second transmission polarization, and receives a quadrature multiplexed signal formed by applying quadrature multiplexing to the first and second transmission polarization.

Fifth Exemplary Embodiment

Figure 11:
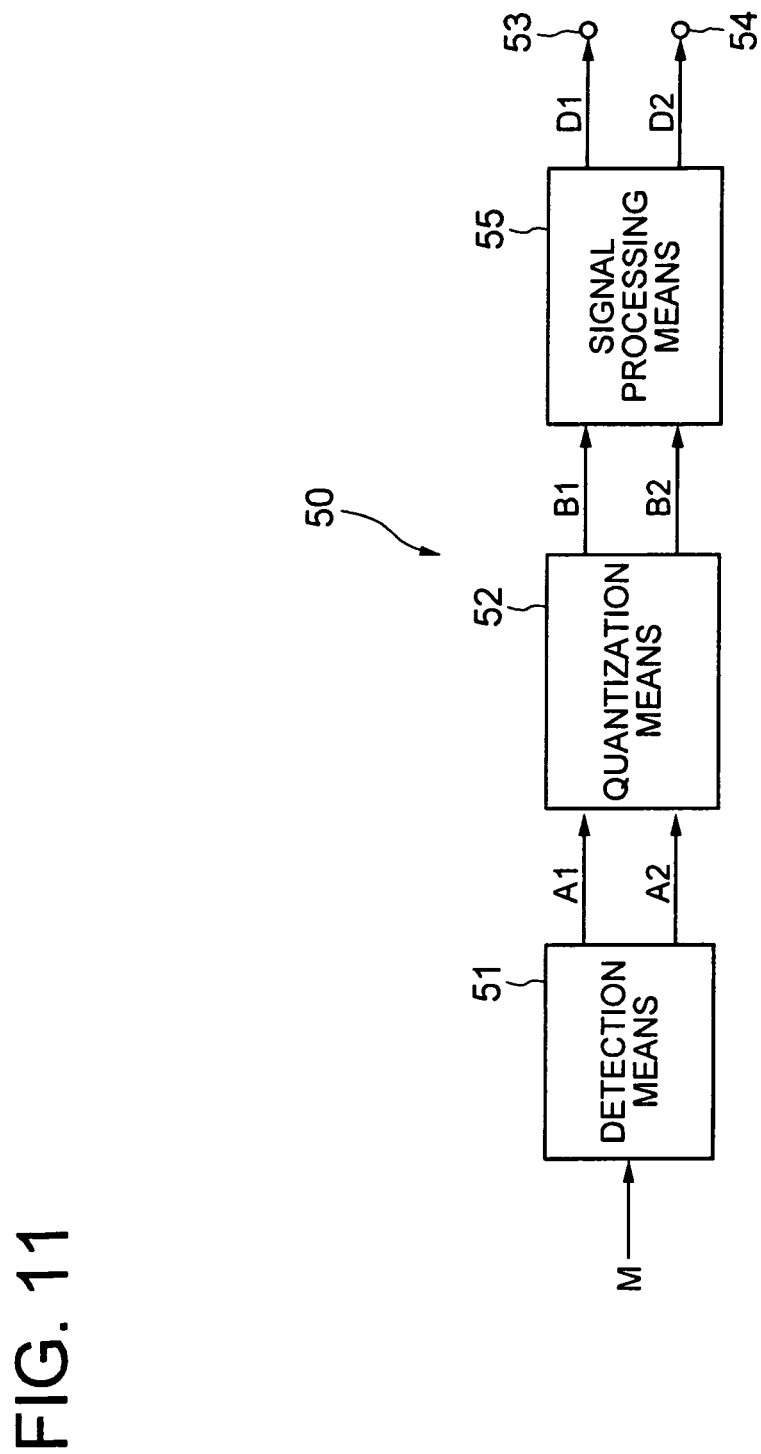
FIG. 11 is a block diagram showing the configuration of an exemplary coherent receiver according to a fifth exemplary embodiment of the present invention.
Figure 12:
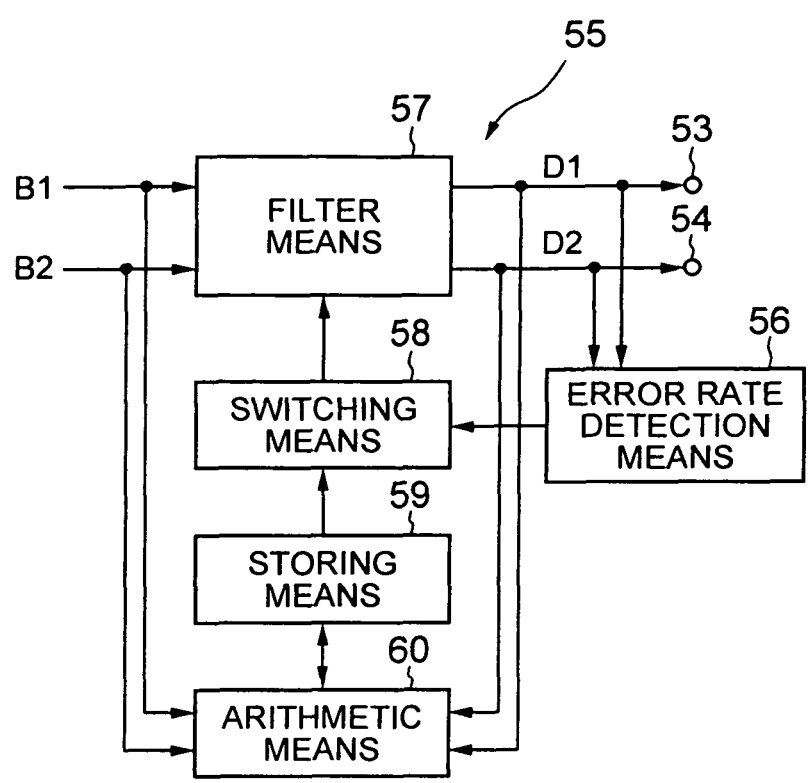
FIG. 12 is a block diagram showing the configuration of the digital signal processing chip shown in FIG. 11.
Figure 13:
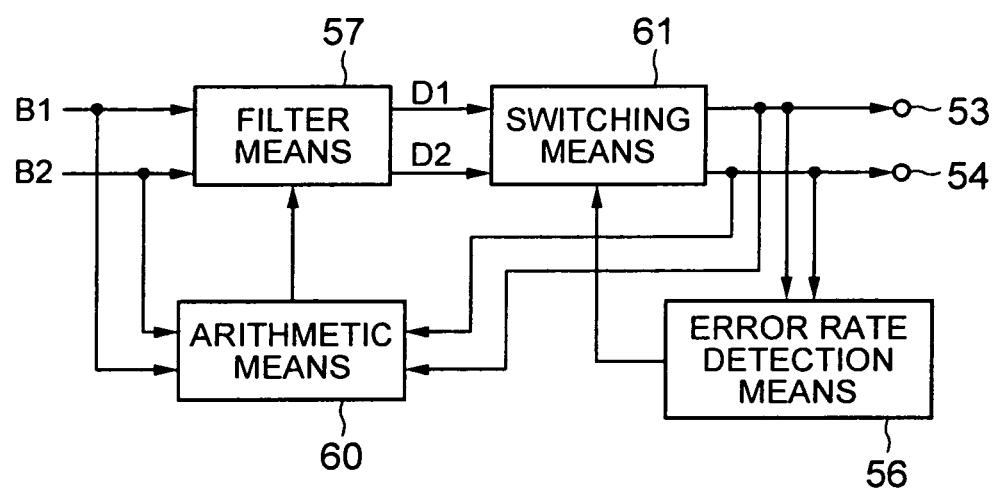
FIG. 13 is a block diagram showing the configuration of another exemplary coherent receiver according to the fifth exemplary embodiment of the present invention.
Figure 14:
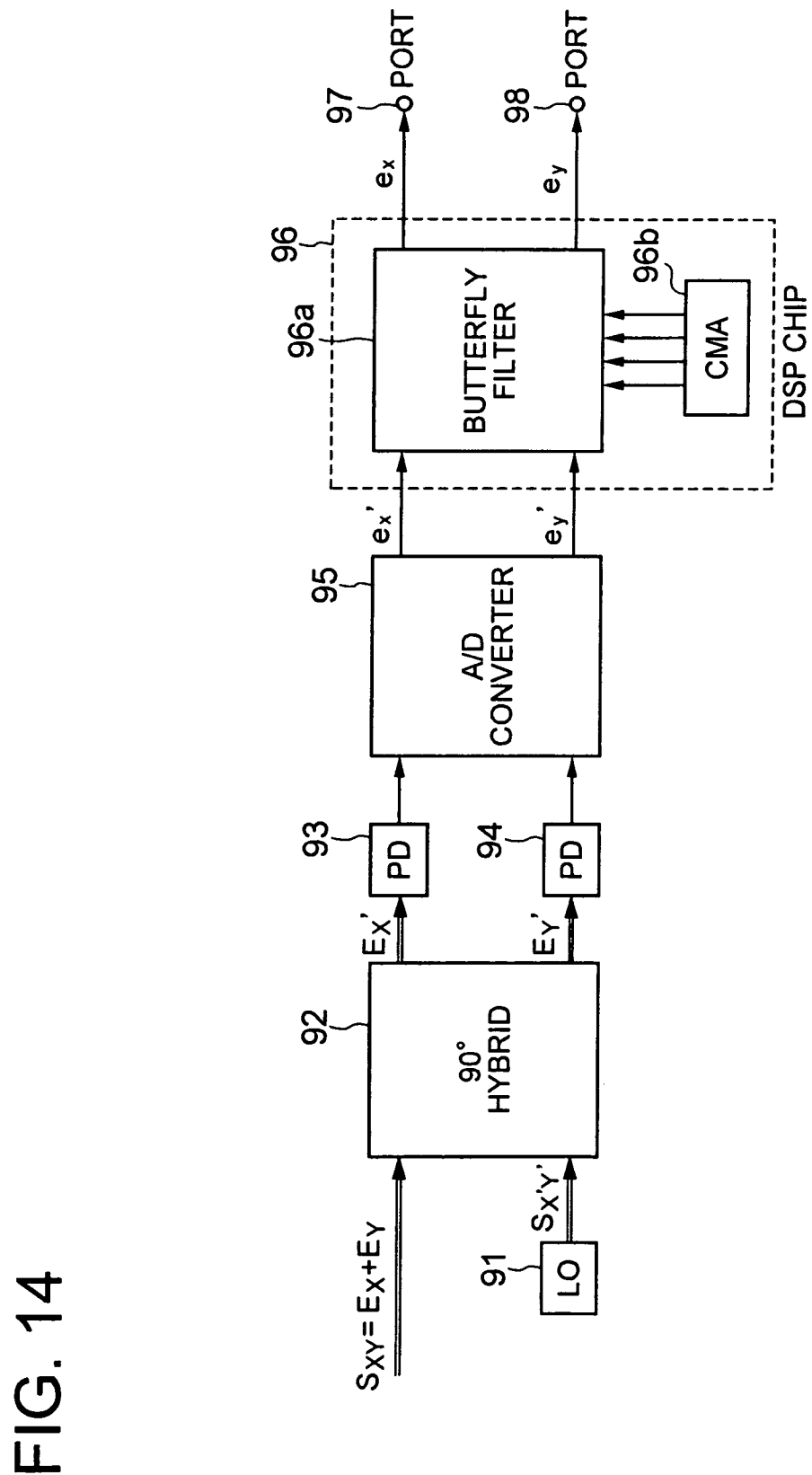
FIG. 14 is a block diagram showing the configuration of a typical coherent receiver.

A fifth exemplary embodiment of the present invention will be described with reference to FIGS. 11 to 13. FIG. 11 is a block diagram showing the configuration of an exemplary coherent receiver according to the fifth exemplary embodiment. FIG. 12 is a block diagram showing the configuration of a digital signal processing chip. FIG. 13 is a block diagram showing the configuration of another exemplary coherent receiver according to the fifth exemplary embodiment. In the fifth exemplary embodiment, the outline of the coherent receiver will be described.

As shown in FIG. 11, a coherent receiver 50 of the fifth exemplary embodiment assigns a first transmission signal to first transmission polarization, assigns a second transmission signal to second transmission polarization, and receives a quadrature multiplexed signal which is formed by applying quadrature multiplexing to the first and second transmission polarization.

The coherent receiver 50 includes a detection means 51 for detecting the first transmission polarization and the second transmission polarization according to prescribed first reception polarization and second reception polarization and obtaining a first detected signal A1 and a second detected signal A2; a quantization means 52 for quantizing the first detected signal A1 and the second detected signal A2 and obtaining a first quantized signal B1 and a second quantized signal B2; and a signal processing means 55 for, when filtering the first quantized signal B1 and the second quantized signal B2 using a prescribed filtering control algorithm to form a first demodulated signal D1 and a second demodulated signal D2 respectively, adjusting filter coefficients of the filtering control algorithm according to the first quantized signal B1 and the second quantized signal B2 and the first demodulated signal D1 and the second demodulated signal D2 and outputting the first demodulated signal D1 and the second demodulated signal D2 to a first output terminal 53 and a second output terminal 54, respectively.

In this way, by adjusting the filter coefficients, a transmission signal, transmitted as X polarization which is first transmission polarization or as Y polarization which is second transmission polarization, can be received by being recognized as X polarization or Y polarization, reliably.

In particular, in the coherent receiver 50 of the fifth exemplary embodiment, the filtering control algorithm is, for example, an algorithm such as CMA or the like for filtering with a matrix in which double-row double-column elements are used as the filter coefficients, and the signal processing means 55 adjusts the filter coefficients by performing switching on the elements of the matrix in accordance with an identification result which identifies whether or not at least one of the first demodulated signal and the second demodulated signal has a prescribed data series.

In this way, by performing switching on the elements of the matrix, it is possible to prevent problems which may be caused due to the filtering control algorithm, whereby a transmission signal, transmitted as X polarization which is first transmission polarization or as Y polarization which is second transmission polarization, can be received by being recognized as X polarization or Y polarization, reliably.

The coherent receiver 50 of the fifth exemplary embodiment receives the quadrature multiplexed signal using the prescribed data series for at least one of the first transmission signal and the second transmission signal. Then, the signal processing means 55 compares the prescribed data series with the first demodulated signal D1 or the second demodulated signal D2. The signal processing means 55 performs true-false determination for determining whether or not the first demodulated signal is output to the first output terminal 53 in accordance with a comparison result, and determines whether or not to perform switching on the elements of the matrix according to a result of the true-false determination. For example, the signal processing means 55 performs switching on the elements of the matrix if the result of the true-false determination is false.

As shown in FIG. 12, the signal processing means 55 includes an error rate detection means 56 for calculating an error rate of at least one of the first demodulated signal D1 and the second demodulated signal D2 respectively obtained from the first transmission signal and the second transmission signal according to the prescribed data series, and performing the true-false determination according to the error rate.

Further, the signal processing means 55 includes a filter means 57 for obtaining the first demodulated signal D1 and the second demodulated signal D2 from the first quantized signal B1 and the second quantized signal B2 by performing filtering using the matrix; an arithmetic means 58 for updating the filter coefficients by the filtering control algorithm according to the first quantized signal B1 and the second quantized signal B2 and the first demodulated signal D1 and the second demodulated signal D2 and using the updated filter coefficients as the elements of the matrix; a storing means 59 for storing the updated filter coefficients; and a switching means 60 for performing switching on the filter coefficients which are the elements of the matrix according to the error rate when supplying the filter coefficients to the filter means.

As shown in FIG. 12, the switching means 60 is disposed between the storing means 59 and the filter means 57. Further, the switching means 60 may be disposed between the arithmetic means 58 and the storing means 59, although not shown. If the switching means 60 is disposed between the arithmetic means 58 and the storing means 59, the filter coefficients are supplied from the storing means 59 to the filter means 57.

Further, in the coherent receiver 50 of the fifth exemplary embodiment, the switching means 60 takes a first selection mode if the result of the true-false determination is true, and takes a second selection mode if the result of the true-false determination is false.

Further, the switching means 60 performs switching control for supplying the filter coefficients to the filter means such that an element in the first row and the first column, an element in the first row and the second column, an element in the second row and the first column, and an element in the second row and the second column in the first selection mode respectively become an element in the second row and the first column, an element in the second row and the second column, an element in the first row and the first column, and an element in the first row and the second column in the second selection mode.

In this way, by performing switching on the elements of the matrix by the switching means 60 so as to change the filter coefficients, a transmission signal, transmitted as X polarization which is first transmission polarization or as Y polarization which is second transmission polarization, can be easily received by being recognized as X polarization or Y polarization reliably in a simple manner.

As shown in FIG. 13, in the coherent receiver 50 of the fifth exemplary embodiment the signal processing means 55 may include a filter means 57 for obtaining the first demodulated signal D1 and the second demodulated signal D2 from the first quantized signal B1 and the second quantized signal B2 by performing filtering using the matrix; an arithmetic means 58 for updating the filter coefficients by the filtering control algorithm according to the first quantized signal B1 and the second quantized signal B2 and the first demodulated signal D1 and the second demodulated signal D2 and supplying the updated filter coefficients as the elements of the matrix to the filter means; and a switching means 61 for controlling switching according to the error rate and outputting the first demodulated signal D1 and the second demodulated signal D2 to the first output terminal 53 and the second output terminal 54, respectively.

Even in the case where a first multilevel modulated signal is used as the first transmission signal and a second multilevel modulated signal is used as the second transmission signal for the quadrature multiplexed signal, the coherent receiver 50 of the fifth exemplary embodiment can be used.

In that case, the signal processing means 55 further estimates phases of the first demodulated signal D1 and the second demodulated signal D2 to obtain an estimation result. Then, the signal processing means 55 adjusts the filter coefficients of the filtering control algorithm using the estimation result of a case where a first binary modulated signal and a second binary modulated signal are respectively used as the first multilevel modulated signal and the second multilevel modulated signal, and outputs the first demodulated signal and the second demodulated signal to the first output terminal 53 and the second output terminal 54, respectively.

Further, the coherent receiver described above can be realized by installing a program in a receiver. Specifically, a program, which is another embodiment of the present invention, is configured to cause a receiver, which assigns a first transmission signal to first transmission polarization, assigns a second transmission signal to second transmission polarization, and receives a quadrature multiplexed signal formed by applying quadrature multiplexing to the first transmission polarization and the second transmission polarization, to detect the first transmission polarization and the second transmission polarization according to prescribed first reception polarization and second reception polarization and obtain a first detected signal and a second detected signal; quantize the first detected signal and the second detected signal and obtain a first quantized signal and a second quantized signal; and when filtering the first quantized signal and the second quantized signal using a prescribed filtering control algorithm to form a first demodulated signal and a second demodulated signal respectively, adjust filter coefficients of the filtering control algorithm according to the first quantized signal and the second quantized signal and the first demodulated signal and the second demodulated signal and output the first demodulated signal and the second demodulated signal to a first output terminal and a second output terminal, respectively.

Further, in this program, the filtering control algorithm is an algorithm for filtering with a matrix in which double-row double-column elements are used as the filter coefficients, and the program causes the receiver to adjust the filter coefficients by performing switching on the elements of the matrix in accordance with an identification result which identifies whether or not at least one of the first demodulated signal and the second demodulated signal has a prescribed data series.

Further, a polarization separation method, which is another embodiment of the present invention, to be executed by the operation of the coherent receiver, includes causing a receiver, which assigns a first transmission signal to first transmission polarization, assigns a second transmission signal to second transmission polarization, and receives a quadrature multiplexed signal formed by applying quadrature multiplexing to the first transmission polarization and the second transmission polarization, to detect the first transmission polarization and the second transmission polarization according to prescribed first reception polarization and second reception polarization and obtain a first detected signal and a second detected signal; quantize the first detected signal and the second detected signal and obtain a first quantized signal and a second quantized signal; and when filtering the first quantized signal and the second quantized signal using a prescribed filtering control algorithm to form a first demodulated signal and a second demodulated signal respectively, adjust filter coefficients of the filtering control algorithm according to the first quantized signal and the second quantized signal and the first demodulated signal and the second demodulated signal and output the first demodulated signal and the second demodulated signal to a first output terminal and a second output terminal, respectively.

In the above polarization separation method, the filtering control algorithm is an algorithm for filtering with a matrix in which double-row double-column elements are used as the filter coefficients, and the method includes causing the receiver to adjust the filter coefficients by performing switching on the elements of the matrix in accordance with an identification result which identifies whether or not at least one of the first demodulated signal and the second demodulated signal has a prescribed data series.

As described above, as the operation similar to that of the above-described coherent receiver is realized even in the program or the polarization separation method configured as described above, the above-described object of the present invention can be achieved.

While the present invention has been described with reference to the exemplary embodiments, the present invention is not limited to these embodiments. It will be understood by those skilled in the art that various changes in form and details may be made therein without departing from the spirit and scope of the present invention as defined by the claims.

This application is based upon and claims the benefit of priority from Japanese patent application No. 2009-112708, filed on May 7, 2009, the disclosure of which is incorporated herein in its entirety by reference.

The present invention is applicable to a receiver which assigns a first transmission signal to first transmission polarization, assigns a second transmission signal to second transmission polarization, and receives and demodulates a quadrature multiplexed signal formed by applying quadrature multiplexing to the first and second transmission polarization.

| [REFERENCE NUMERALS] | |
|---|---|
| 1 | coherent receiver |
| 10 | optical to electrical (O/E) converter |
| 11 | local light oscillator (LO) |
| 12 | 90° hybrid |
| 13a, 13b | photodetector |
| 20 | analog to digital (A/D) converter |
| 30 | digital signal processing (DSP) chip |
| 31 | butterfly filter |
| 32 | CMA block |
| 32a | coefficient selection switch (SW) |
| 32b | coefficient storing memory |
| 32c | CMA operation section |
| 33 | BER block |

The invention claimed is:

1. A coherent receiver that receives a first transmission signal associated with a first transmission polarization, and a second transmission signal associated with a second transmission polarization, by way of a quadrature multiplexed signal formed by applying quadrature multiplexing to the first transmission polarization and the second transmission polarization, the receiver comprising:
 a detection unit that detects the first transmission polarization and the second transmission polarization according to prescribed first reception polarization and second reception polarization and obtains a first detected signal and a second detected signal;
 a quantization unit that quantizes the first detected signal and the second detected signal and obtains a first quantized signal and a second quantized signal; and
 a signal processing unit filtering the first quantized signal and the second quantized signal using a prescribed filtering control algorithm to form a first demodulated signal and a second demodulated signal respectively, adjusting filter coefficients of the filtering control algorithm according to the first quantized signal and the second quantized signal and the first demodulated signal and the second demodulated signal, and outputting the first demodulated signal and the second demodulated signal to a first output terminal and a second output terminal, respectively, wherein the filtering control algorithm comprises an algorithm for filtering with a matrix in which double-row double-column elements are used as the filter coefficients, and
 the signal processing unit adjusts the filter coefficients by performing switching on the elements of the matrix in accordance with an identification result which identifies whether or not at least one of the first demodulated signal and the second demodulated signal has a prescribed data series.

2. The coherent receiver, according to claim 1, wherein the coherent receiver receives the quadrature multiplexed signal using the prescribed data series for at least one of the first transmission signal and the second transmission signal, and
 the signal processing unit compares the prescribed data series with the first demodulated signal or the second demodulated signal, performs true-false determination for determining whether or not the first demodulated signal is output to the first output terminal in accordance with a comparison result, and determines whether or not to perform switching on the elements of the matrix according to a result of the true-false determination.

3. The coherent receiver, according to claim 2, wherein if the result of the true-false determination is false, the signal processing unit performs switching on the elements of the matrix.

4. The coherent receiver, according to claim 2, wherein the signal processing unit includes an error rate detection unit that calculates an error rate of at least one of the first demodulated signal and the second demodulated signal respectively obtained from the first transmission signal and the second transmission signal according to the prescribed data series, and performs the true-false determination according to the error rate.

5. The coherent receiver, according to claim 4, wherein the signal processing unit includes:
 a filter unit that obtains the first demodulated signal and the second demodulated signal from the first quantized signal and the second quantized signal by performing filtering using the matrix;
 an arithmetic unit that updates the filter coefficients by the filtering control algorithm according to the first quantized signal and the second quantized signal and the first demodulated signal and the second demodulated signal and uses the updated filter coefficients as the elements of the matrix;
 a storing unit that stores the updated filter coefficients; and
 a switching unit that performs switching on the filter coefficients which are the elements of the matrix according to the error rate when supplying the filter coefficients to the filter unit.

6. The coherent receiver, according to claim 5, wherein the switching unit is disposed between the storing unit and the filter unit.

7. The coherent receiver, according to claim 5, wherein the switching unit is disposed between the arithmetic unit and the storing unit, and
 the filter coefficients are supplied from the storing unit to the filter unit.

8. The coherent receiver, according to claim 5, wherein the switching unit takes a first selection mode if the result of the true-false determination is true and takes a second selection mode if the result of the true-false determination is false, and
 the switching unit performs switching control for supplying the filter coefficients to the filter means such that an element in the first row and the first column, an element in the first row and the second column, an element in the second row and the first column, and an element in the second row and the second column in the first selection mode respectively become an element in the second row and the first column, an element in the second row and the second column, an element in the first row and the first column, and an element in the first row and the second column in the second selection mode.

9. The coherent receiver, according to claim 4, wherein the signal processing unit includes:
 a filter unit that obtains the first demodulated signal and the second demodulated signal from the first quantized signal and the second quantized signal by performing filtering using the matrix;
 an arithmetic unit that updates the filter coefficients by the filtering control algorithm according to the first quantized signal and the second quantized signal and the first demodulated signal and the second demodulated signal and supplies the updated filter coefficients as the elements of the matrix to the filter unit; and a switching unit that controls switching according to the error rate and outputs the first demodulated signal and the second demodulated signal to the first output terminal and the second output terminal, respectively.

10. The coherent receiver according to claim 1, wherein a first multilevel modulated signal is used as the first transmission signal and a second multilevel modulated signal is used as the second transmission signal, the signal processing unit further estimates phases of the first demodulated signal and the second demodulated signal to obtain an estimation result, and the signal processing unit adjusts the filter coefficients of the filtering control algorithm using the estimation result of a case where a first binary modulated signal and a second binary modulated signal are respectively used as the first multilevel modulated signal and the second multilevel modulated signal, and outputs the first demodulated signal and the second demodulated signal to the first output terminal and the second output terminal, respectively.

11. A computer-readable medium storing a polarization separation program comprising instructions for a receiver, which includes a unit to:

detect a first transmission polarization and a second transmission polarization according to a prescribed first reception polarization and second reception polarization and obtain a first detected signal and a second detected signal;

quantize the first detected signal and the second detected signal and obtain a first quantized signal and a second quantized signal;

wherein the receiver receives a first transmission signal associated with the first transmission polarization, and a second transmission signal associated with the second transmission polarization, by way of a quadrature multiplexed signal formed by applying quadrature multiplexing to the first transmission polarization and the second transmission polarization:

the receiver filtering the first quantized signal and the second quantized signal using a prescribed filtering control algorithm to form a first demodulated signal and a second demodulated signal respectively, filter coefficients of the filtering control algorithm according to the first quantized signal and the second quantized signal and the first demodulated signal and the second demodulated signal, and outputting the first demodulated signal and the second demodulated signal to a first output terminal and a second output terminal, respectively, and wherein the filtering control algorithm comprises an algorithm for filtering with a matrix in which double-row double-column elements are used as the filter coefficients, and the program causes the receiver to adjust the filter coefficients by performing switching on the elements of the matrix in accordance with an identification result which identifies whether or not at least one of the first demodulated signal and the second demodulated signal has a prescribed data series.

12. A polarization separation method comprising causing receiver that receives a first transmission signal associated with a first transmission polarization, and a second transmission signal associated with a second transmission polarization, by way of a quadrature multiplexed signal formed by applying quadrature multiplexing to the first transmission polarization and the second transmission polarization, to:

detect the first transmission polarization and the second transmission polarization according to prescribed first reception polarization and second reception polarization and obtain a first detected signal and a second detected signal;

quantize the first detected signal and the second detected signal and obtain a first quantized signal and a second quantized signal; and filter the first quantized signal and the second quantized signal using a prescribed filtering control algorithm to form a first demodulated signal and a second demodulated signal respectively, adjust filter coefficients of the filtering control algorithm according to the first quantized signal and the second quantized signal and the first demodulated signal and the second demodulated signal, and output the first demodulated signal and the second demodulated signal to a first output terminal and a second output terminal, respectively, wherein the filtering control algorithm comprises an algorithm for filtering with a matrix in which double-row double-column elements are used as the filter coefficients, and the method includes causing the receiver to adjust the filter coefficients by performing switching on the elements of the matrix in accordance with an identification result which identifies whether or not at least one of the first demodulated signal and the second demodulated signal has a prescribed data series.

13. A coherent receiver that receives a first transmission signal associated with a first transmission polarization, and a second transmission signal associated with a second transmission polarization, by way of a quadrature multiplexed signal formed by applying quadrature multiplexing to the first transmission polarization and the second transmission polarization, the receiver comprising:

detection means for detecting the first transmission polarization and the second transmission polarization according to prescribed first reception polarization and second reception polarization and obtaining a first detected signal and a second detected signal;

quantization means for quantizing the first detected signal and the second detected signal and obtaining a first quantized signal and a second quantized signal; and signal processing means for, filtering the first quantized signal and the second quantized signal using a prescribed filtering control algorithm to form a first demodulated signal and a second demodulated signal respectively, adjusting filter coefficients of the filtering control algorithm according to the first quantized signal and the second quantized signal and the first demodulated signal and the second demodulated signal, and outputting the first demodulated signal and the second demodulated signal to a first output terminal and a second output terminal, respectively, wherein the filtering control algorithm comprises an algorithm for filtering with a matrix in which double-row double-column elements are used as the filter coefficients, and the signal processing means adjusts the filter coefficients by performing switching on the elements of the matrix in accordance with an identification result which identifies whether or not at least one of the first demodulated signal and the second demodulated signal has a prescribed data series.

14. A coherent receiver that receives a first transmission signal associated with a first transmission polarization, and a second transmission signal associated with a second transmission polarization, by way of a quadrature multiplexed signal formed by applying quadrature multiplexing to the first transmission polarization and the second transmission polarization, the receiver comprising:

a detection unit that detects the first transmission polarization and the second transmission polarization according to prescribed first reception polarization and second reception polarization and obtains a first detected signal and a second detected signal;

a quantization unit that quantizes the first detected signal and the second detected signal and obtains a first quantized signal and a second quantized signal; and a signal processing unit filtering the first quantized signal and the second quantized signal using a prescribed filtering control algorithm to form a first demodulated signal and a second demodulated signal respectively, adjusting filter coefficients of the filtering control algorithm according to the first quantized signal and the second quantized signal and the first demodulated signal and the second demodulated signal, and outputting the first demodulated signal and the second demodulated signal to a first output terminal and a second output terminal, respectively, wherein the filter coefficients include a first filter coefficient used for generating a first demodulated signal and a second filter coefficient used for generating a second demodulated signal, and the signal processing unit updates the first filter coefficient based on the second filter coefficient and also updates the second filter coefficient based on the updated first filter coefficient.

15. The coherent receiver, according claim 14, wherein the signal processing unit switches the first filter coefficient with the second filter coefficient and also switches the second filter coefficient with the updated first filter coefficient.

16. The coherent receiver, according claim 14, wherein the coherent receiver receives the quadrature multiplexed signal using a prescribed data series for at least one of the first transmission signal and the second transmission signal, and the signal processing unit updates the first filter coefficient based on the second filter coefficient and also updates the second filter coefficient based on the updated first filter coefficient, in accordance with a determination result which determines whether or not at least one of the first demodulated signal and the second demodulated signal has a prescribed data series.

17. The coherent receiver, according to claim 16, wherein the signal processing unit calculates an error rate of at least one of the first demodulated signal and the second demodulated signal respectively obtained from the first transmission signal and the second transmission signal according to the prescribed data series, and updates the first filter coefficient based on the second filter coefficient and also updates the second filter coefficient based on the updated first filter coefficient, in accordance with the calculated error rate.

18. A polarization separation method comprising causing receiver that receives a first transmission signal associated with a first transmission polarization, and a second transmission signal associated with a second transmission polarization, by way of a quadrature multiplexed signal formed by applying quadrature multiplexing to the first transmission polarization and the second transmission polarization, to:

detect the first transmission polarization and the second transmission polarization according to prescribed first reception polarization and second reception polarization and obtain a first detected signal and a second detected signal;

quantize the first detected signal and the second detected signal and obtain a first quantized signal and a second quantized signal; and filter the first quantized signal and the second quantized signal using a prescribed filtering control algorithm to form a first demodulated signal and a second demodulated signal respectively, adjust filter coefficients of the filtering control algorithm according to the first quantized signal and the second quantized signal and the first demodulated signal and the second demodulated signal, and output the first demodulated signal and the second demodulated signal to a first output terminal and a second output terminal, respectively, wherein the filter coefficients include a first filter coefficient used for generating a first demodulated signal and a second filter coefficient used for generating a second demodulated signal, and update the first filter coefficient based on the second filter coefficient and also updates the second filter coefficient based on the updated first filter coefficient.

19. The polarization separation method, according to claim 18, comprising switching the first filter coefficient with the second filter coefficient and also switching the second filter coefficient with the first coefficient.

20. The polarization separation method according to claim 18, wherein the coherent receiver receives the quadrature multiplexed signal using a prescribed data series for at least one of the first transmission signal and the second transmission signal, and a signal processing unit updates the first filter coefficient based on the second filter coefficient and also updates the second filter coefficient based on the updated first filter coefficient, in accordance with a determination result which determines whether or not at least one of the first demodulated signal and the second demodulated signal has a prescribed data series.

21. The coherent receiver, according to claim 20, wherein the signal processing unit calculates an error rate of at least one of the first demodulated signal and the second demodulated signal respectively obtained from the first transmission signal and the second transmission signal according to the prescribed data series, and updates the first filter coefficient based on the second filter coefficient and also updates the second filter coefficient based on the updated first filter coefficient, in accordance with the calculated error rate.

* * * * *